United States Patent
Kamata

(10) Patent No.: US 9,528,690 B2
(45) Date of Patent: Dec. 27, 2016

(54) LIGHTING DEVICE, DISPLAY DEVICE AND TELEVISION DEVICE

(75) Inventor: Daisuke Kamata, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 708 days.

(21) Appl. No.: 13/814,889

(22) PCT Filed: Aug. 9, 2011

(86) PCT No.: PCT/JP2011/068132
§ 371 (c)(1),
(2), (4) Date: Feb. 7, 2013

(87) PCT Pub. No.: WO2012/023458
PCT Pub. Date: Feb. 23, 2012

(65) Prior Publication Data
US 2013/0135539 A1 May 30, 2013

(30) Foreign Application Priority Data
Aug. 19, 2010 (JP) ................................ 2010-184055

(51) Int. Cl.
*F21V 21/00* (2006.01)
*G02F 1/1335* (2006.01)
*H04N 3/14* (2006.01)

(52) U.S. Cl.
CPC ......... *F21V 21/00* (2013.01); *G02F 1/133603* (2013.01); *G02F 1/133605* (2013.01);
(Continued)

(58) Field of Classification Search
CPC .................. G02F 1/133606–1/133608
(Continued)

(56) References Cited

U.S. PATENT DOCUMENTS

| 4,747,613 A * | 5/1988 | Brichoud ............... A63C 9/00 280/611 |
| 8,416,352 B2 * | 4/2013 | Mori ............................ 349/15 |

(Continued)

FOREIGN PATENT DOCUMENTS

JP  2007-322697 A  12/2007

OTHER PUBLICATIONS

Official Communication issued in International Patent Application No. PCT/JP2011/068132, mailed on Oct. 25, 2011.

*Primary Examiner* — Renee Chavez
*Assistant Examiner* — Christopher E Dunay
(74) *Attorney, Agent, or Firm* — Keating & Bennett, LLP

(57) ABSTRACT

An object of this invention is to suppress uneven brightness in the lighting device. The lighting device according to this invention includes LEDs 17, an LED board 18, a chassis 14, a reflection sheet 22, an optical member 15, a supporting pin 20, and a rivet 21. The reflection sheet 22 has a supporting pin through hole 22a and a rivet through hole 22b. The supporting pin 20 is mounted to the chassis 14 through the supporting pin through holes 22a. The supporting pin 20 supports the optical member 15. The rivet 21 is mounted to the chassis 14 through the rivet through hole 22b. The reflection sheet 22 has an opening 23. The opening 23 is arranged adjacent to or close to any one of the supporting pin through hole 22a and the rivet through hole 22b. The LED board 18 has a colored portion 24 arranged thereon. The colored portion 24 is in a color different from that of the reflection sheet 22 such that the colored portion is distinguished from the reflection sheet and arranged at least in an area that overlaps at least the opening in the reflection sheet.

11 Claims, 16 Drawing Sheets

(52) U.S. Cl.
CPC .. *G02F 1/133608* (2013.01); *G02F 1/133609* (2013.01); *H04N 3/14* (2013.01)

(58) Field of Classification Search
USPC ................. 362/97.1–97.4, 632–634, 600
See application file for complete search history.

(56) References Cited

U.S. PATENT DOCUMENTS

| | | | |
|---|---|---|---|
| 2006/0072299 A1* | 4/2006 | Lai .................... | G02F 1/133608 362/97.1 |
| 2009/0135330 A1* | 5/2009 | Kawase et al. ................. | 349/58 |
| 2009/0135583 A1* | 5/2009 | Hillman et al. ............. | 362/97.1 |
| 2009/0154139 A1* | 6/2009 | Shin ........................... | 362/97.1 |
| 2010/0103652 A1* | 4/2010 | Ito ............................... | 362/97.1 |
| 2010/0157588 A1* | 6/2010 | Tsai ............................. | 362/234 |
| 2011/0234424 A1* | 9/2011 | Chen ........................... | 340/907 |
| 2012/0014093 A1* | 1/2012 | Arai ............................ | 362/97.1 |

* cited by examiner

FIG.1
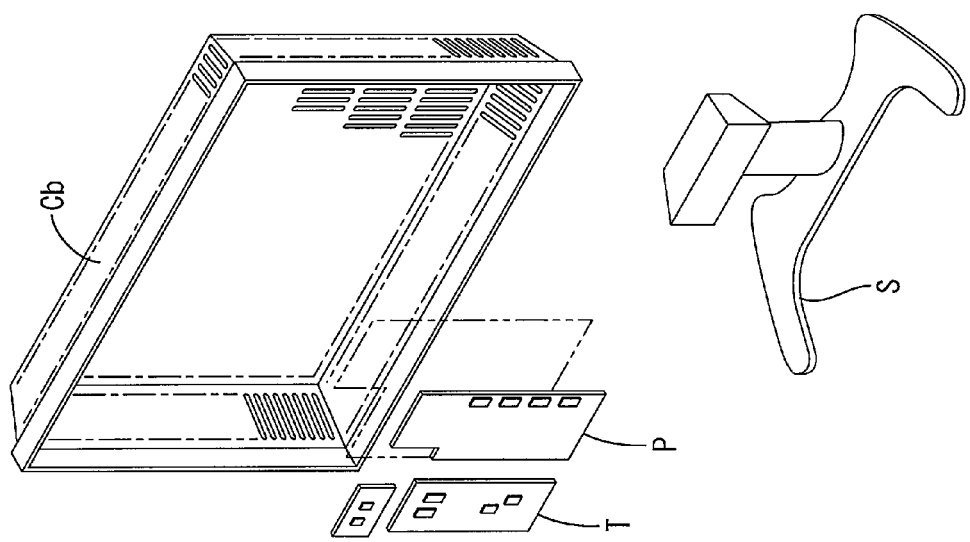
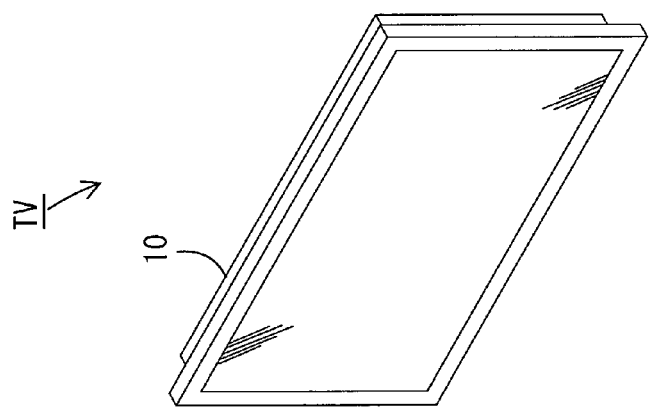
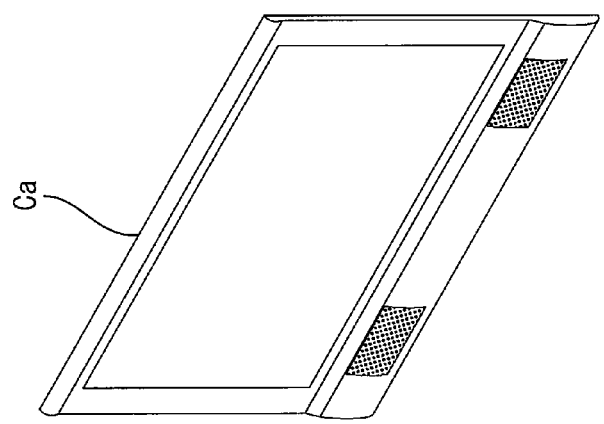

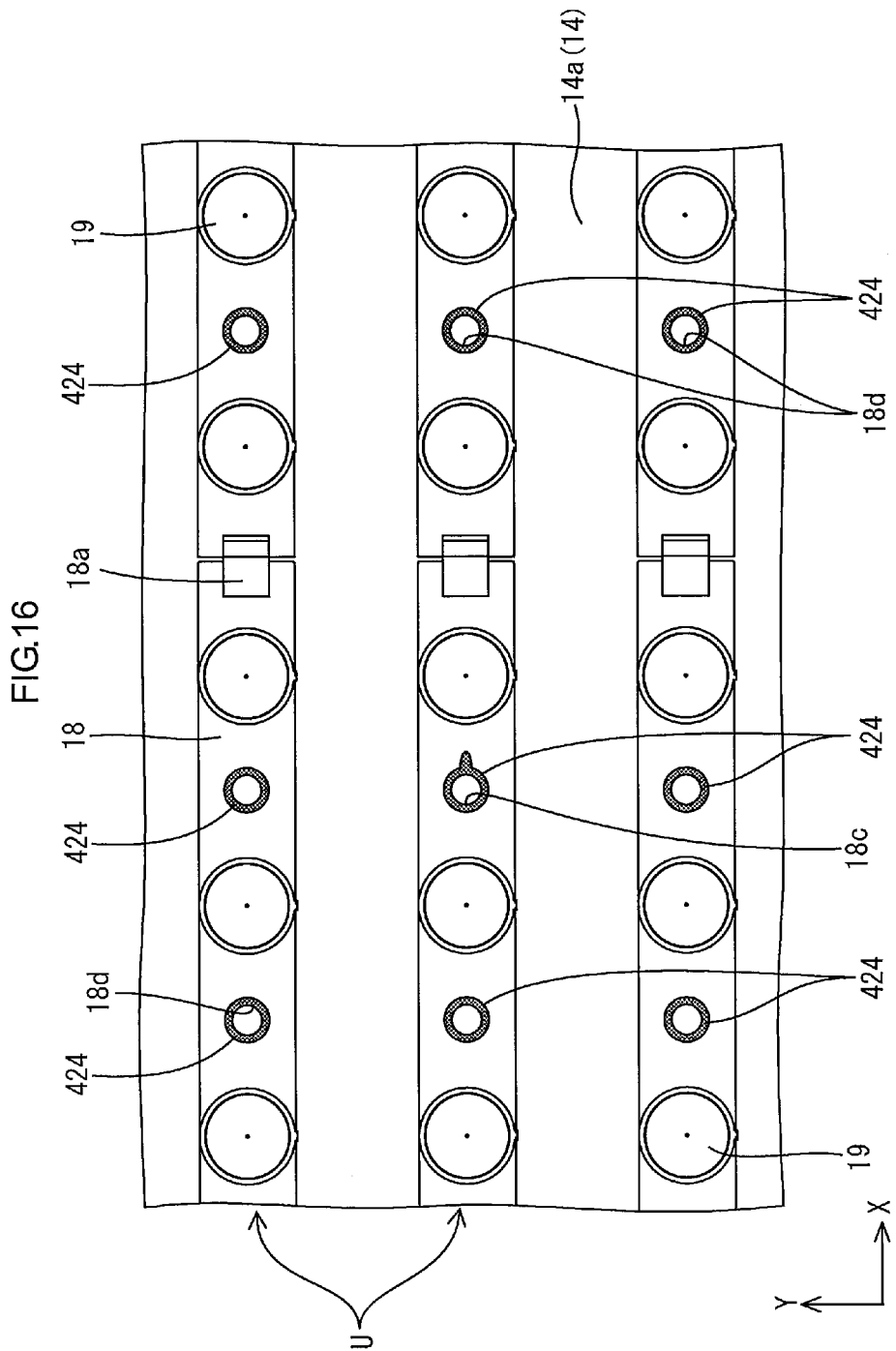

LIGHTING DEVICE, DISPLAY DEVICE AND TELEVISION DEVICE

TECHNICAL FIELD

The present invention relates to a lighting device, a display device, and a television device.

BACKGROUND ART

Displays in image display devices, such as television devices, are now being shifted from conventional cathode-ray tube displays to thin displays, such as liquid crystal displays and plasma displays. Liquid crystal panels do not emit light. If the liquid crystal panels are used as display components in the liquid crystal display devices, backlight devices are required as separate lighting devices.

Patent Document 1 discloses a transmissive backlight device including a back chassis, alight source block, a diffusion light guide plate, a reflection sheet, and a plurality of optical stud members. The light source block is mounted on the back chassis. The reflection sheet reflects light toward the diffusion light guide plate. The optical stud members are mounted on the back chassis. Distal end portions of the optical members are held against the diffusion light guide plate to regulate a distance between the diffusion light guide plate and the reflection sheet and a distance between the reflection sheet and the back chassis. In such a backlight device, the optical stud members (supporting pins) may restrict the diffusion light guide plate (an optical member) from bending toward the back chassis. Further, the optical stud members may position the diffusion guide plate with high accuracy in the backlight chassis. As a result, uneven brightness is less likely to occur.

RELATED ART DOCUMENT

Patent Document

Patent Document 1: Japanese Unexamined Patent Application Publication No. 2007-322697

Problem to be Solved by the Invention

In a direct (transmissive) backlight device, a reflection sheet may be placed against a chassis together with a substrate (light source block) fixed thereto with rivets so that the reflection is less likely to be lifted. In a backlight device including supporting pins and the rivets, supporting pins and rivets are fixed to the chassis through the reflection sheet and the substrate. Therefore, the reflection sheet and the substrate have supporting pin through holes and rivet through holes through which the supporting pins and the rivets are passed.

During mounting of the supporting pins and the rivets, the supporting pin through holes and the rivet through holes in the reflection sheet are distinguished from each other and the supporting pins and the rivets are mounted to predetermined positions. If differences between the supporting pin through holes and the rivet through holes are not easily recognized by appearance, the supporting pins and the rivets may be mounted at improper positions. If the rivet is placed in the supporting pin through hole, he optical member is not properly supported and thus the optical member is not accurately positioned in the backlight chassis. As a result, uneven brightness may occur.

DISCLOSURE OF THE PRESENT INVENTION

This invention was made in view of the above circumstances. An object of this invention is to provide a lighting device including a supporting pin that hold an optical member and a rivet that fixes a reflection sheet. Furthermore, the lighting device is configured such that improper mounting of the supporting pin and the rivet, which may result in uneven brightness, is less likely to occur. Another object of this invention is to provide a display device and a television device each including the lighting device.

Means for Solving the Problem

To solve the above problem, a lighting device includes a light source, a board, a chassis, a reflection sheet, an optical member, a supporting pin, and a rivet. The board includes the light source mounted on one of surfaces, a board through hole, and at least one colored portion on the one of surfaces. The chassis supports another one of surfaces of the board. The reflection sheet is arranged on the one of surfaces of the board. The reflection sheet has a first through hole, a second through hole, and an opening. The opening for distinguishing between the first through hole and the second through hole is arranged adjacent to close to one of the first through hole and the second through hole. The optical member is arranged opposite the reflection sheet and configured to diffuse light from the light source. The supporting pin is mounted to the chassis through the first through hole in the reflection sheet and the board through hole in the board. The supporting pin supports the optical member. The rivet is mounted to the chassis through the second through hole in the reflection sheet and the board through hole in the board. The rivet fixes the reflection sheet to the chassis. The colored portion is in a color different from that of the reflection sheet and arranged at least in an area that overlaps at least the opening in the reflection sheet.

According to this invention, the colored portion is arranged at least in an area of the first surface of board that overlaps at least the opening in the reflection sheet. Further, the colored portion is in a color different from that of the reflection sheet. With this configuration, the presence or absence of the opening is easily recognized and the first through hole and the second through hole are easily distinguished. Therefore, the supporting pin and the rivet are less likely to be mounted to positions other than the predetermined positions. Improper mounting of the supporting pin may cause the bending of the optical member and may cause uneven brightness. However, this is less likely to occur with the above configuration. Specifically, during mounting operation of the supporting pin and the rivet, a part of the colored portion is visible through the opening. Therefore, the visibility of the opening is improved. Thus, the presence or absence of the opening is easily recognized and the first through hole and the second through hole that are provided to the reflection sheet can be easily distinguished.

In the above configuration, the supporting pin may further include a flange portion and the rivet may further include a head portion that has a dimension smaller than that of the flange portion of the supporting pin. The opening may be arranged adjacent to or close to the first through hole in the reflection sheet such that the opening is covered by the flange portion of the support pin when the supporting pin is mounted to the chassis through the first through hole in the reflection sheet and the board through hole in the board, or at least a part of the opening is visible when the rivet is mounted to the chassis through the first through hole in the reflection sheet and the board through hole in the board. With this configuration, if the rivet is improperly mounted to the first through hole, the part of the opening and a part of the colored portion become visible. Thus, the improper mounting can be recognized visually.

In the above configuration, the supporting pin may further includes a flange portion and the rivet may further include a head portion that has a dimension greater than that of the flange portion of the supporting pin. The opening may be arranged adjacent to or close to the second through hole in the reflection sheet such that the opening is covered by the head portion of the rivet when the rivet is mounted to the chassis through the second through hole in the reflection sheet and the board through hole in the board, or at least a part of the opening is visible when the supporting pin is mounted to the chassis through the second through hole in the reflection sheet and the board through hole in the board. With this configuration, if the supporting pin is improperly mounted to the second through hole, the part of the opening and a part of the colored portion become visible. Thus, the improper mounting can be recognized visually.

The at least one colored portion may further include a plurality of the colored portions arranged in areas that overlap the opening, the first through hole, and the second through hole in the reflection sheet, respectively. Because this ensures the visibility of the first through hole and the second through hole, the positions of the first through holes and the second through holes are easily recognized. This improves the mounting workability of the supporting pins and the rivets. Further, if any of the first through holes or the second through holes are not received the supporting pins or the rivets, those holes become easily visible. Accordingly, the supporting pins and the rivets can be properly mounted.

In the above configuration, the lighting device may further include a temporary fixing member mounted to the chassis through the board through hole to temporarily fix the board to the chassis. The board has an area surrounding the board through hole through which the temporary fixing member is inserted. The surrounding area has a different color from that of the colored portion such that the surrounding area is distinguished from the colored portion. With this configuration, the colored portion is arranged in the surrounding area of the board through hole through which the supporting pin and the rivet are inserted, that is, the holes overlapping the first through hole and the second through hole. On the other hand, the colored portion is not arranged in the area that surrounds the board through hole through which the temporary fixing member is inserted. Therefore, during temporarily fixing the board to the chassis, the board through hole for the temporary fixing member and the board through holes for the supporting pin and the rivet can be distinguished by the colored portions. Thus, the improper mounting of the temporary fixing members being inserted to the board through holes for the supporting pin and the rivet is less likely to occur.

In the above configuration, the colored portion may be formed on the board by printing. With this configuration, the colored portion can be easily formed.

Further, the colored portions may be arranged only in areas that overlap the opening, the first through hole, and the second through hole, respectively. With this configuration, the colored portions are not arranged at areas over the opening, the first through hole, and the second through hole. Thus, the consumption of the printing ink for forming the colored portions can be reduced and this lowers costs.

Next, to solve the above problem, a display device of this invention may include the above lighting device and a display panel configured to provide display using light from the lighting device.

The display panel may be a liquid crystal panel. The display device as a liquid crystal display device has a variety of applications, such as a television display or a personal-computer display. Particularly, it is suitable for a large screen display.

Next, to solve the above problem, a television device of this invention may include the above display device.

Advantageous Effect of the Invention

According to present invention, a lighting device configured such that improper mounting of a supporting pin and a rivet, which may result in uneven brightness, is reduced, a display device and a television device each including the lighting device can be provided.

BRIEF DESCRIPTION OF THE DRAWINGS

FIG. 1 is an exploded perspective view illustrating a general configuration of a television device according to a first embodiment of this invention.

FIG. 16 is a magnified plan view of the liquid crystal display device without a supporting pin, a rivet, and a reflection sheet according to the fifth embodiment.

MODE FOR CARRYING OUT THE INVENTION

First Embodiment

A first embodiment of this invention will be described with reference to FIGS. 1 to 10. In this embodiment, a liquid crystal display device 10 will be explained. X-axes, Y-axes, and Z-axes are in some drawings. Directions indicated by the axes in each drawing correspond to directions indicated by the respective axes in other drawings. An upper side in FIG. 3 corresponds to a front-surface side and a lower side in FIG. 3 corresponds to a rear-surface side.

Figure 2:
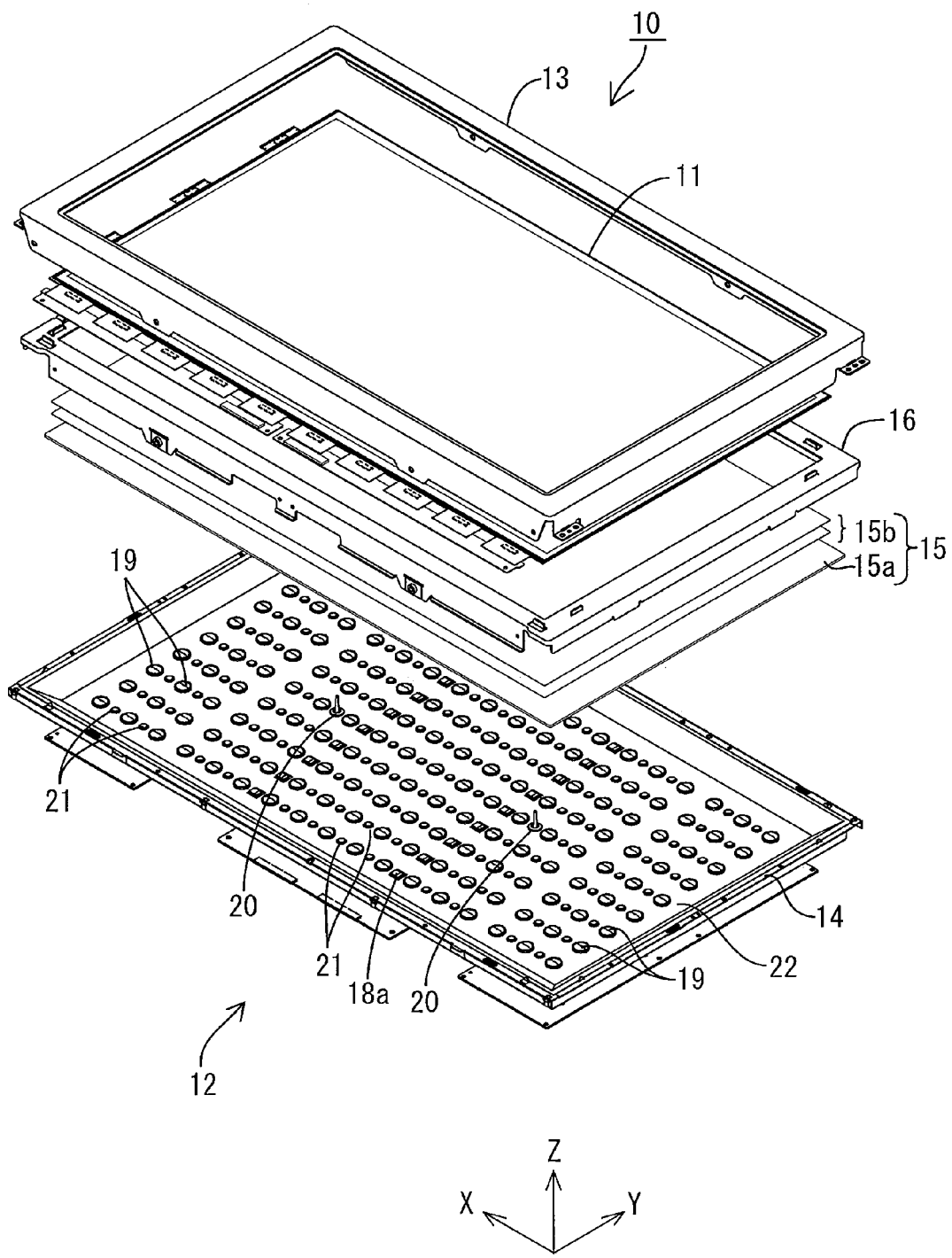
FIG. 2 is an exploded perspective view illustrating a general configuration of a liquid crystal display device included in the television device in FIG. 1.

As illustrated in FIG. 1, the television device TV of this embodiment includes the liquid crystal display device 10, front and rear cabinets Ca, Cb which house the liquid crystal display device 10 therebetween, a power source P, a tuner T and a stand S. An overall shape of the liquid crystal display device 10 (display device) is a landscape rectangular (a rectangular shape). The liquid crystal display device 10 is housed in a vertical position. As illustrated in FIG. 2, the liquid crystal display device 10 includes a liquid crystal panel 11 as a display panel, and a backlight device 12 (lighting device) as an external light source. The liquid crystal panel 11 and the backlight device 12 are integrally held by a frame shaped bezel 13. In this embodiment, a display size is 42 inches and an aspect ratio is 16:9.

Next, the liquid crystal panel 11 and the backlight device 12 included in the liquid crystal display device 10 will be described. The liquid crystal panel 11 (display panel), which is formed in a rectangular shape in a plan view, includes a pair of glass substrates and liquid crystals. The glass substrates are bonded together with a predetermined gap therebetween. The liquid crystals are sealed between the glass substrates. On one of the glass substrates, switching components (for example, TFTs) connected to source lines and gate lines which are perpendicular to each other, pixel electrodes connected to the switching components, and an alignment film are provided. On the other substrate, color filters having color sections such as R (red), G (green) and B (blue) color sections arranged in a predetermined pattern, counter electrodes, and an alignment film are provided. Polarizing plates 11A, 11B are attached to outer surfaces of the glass substrates.

The backlight device 12 will be explained in detail. The backlight device 12 is a direct backlight device that includes a plurality of LED units U behind a panel surface (display surface) of the liquid crystal panel 11. As illustrated in FIG. 2, the backlight device 12 includes a chassis 14, an optical member set 15 (a diffuser plate 15a, and a plurality of optical sheets 15b which are provided between the diffuser plate 15a and the liquid crystal panel 11), a frame 16, and a chassis reflection sheet 22. The chassis 14 has a substantially box-shape and has an opening on a light exit side (on the liquid crystal panel 11 side). The optical member set 15 is provided so as to cover the opening in the chassis 14. The frame 16 is provided along an outer edge of the chassis 14 and holds outer edges of the optical member set 15 such that the outer edges are sandwiched between the frame 16 and the chassis 14. The chassis reflection sheet 22 covers almost entire inner surface of the chassis 14 and reflects light in the chassis 14 to the optical member set 15 side.

Furthermore, a plurality of LED units U (light source unit) each including LEDs 17 (light emitting diodes) as light sources are held in the chassis 14. Furthermore, supporting pins 20 and rivets 21 are arranged inside the chassis 14. The supporting pins 20 support the optical member set 15 and hold LED boards 18. The rivets 21 hold the chassis reflection sheet 22 and the LED boards 18. In the backlight device 12, the light exit side of the backlight device 12 is a side closer to the optical member 15 (front-surface side) than the LED units U. In the following, each component of the backlight device 12 will be explained.

Figure 3:
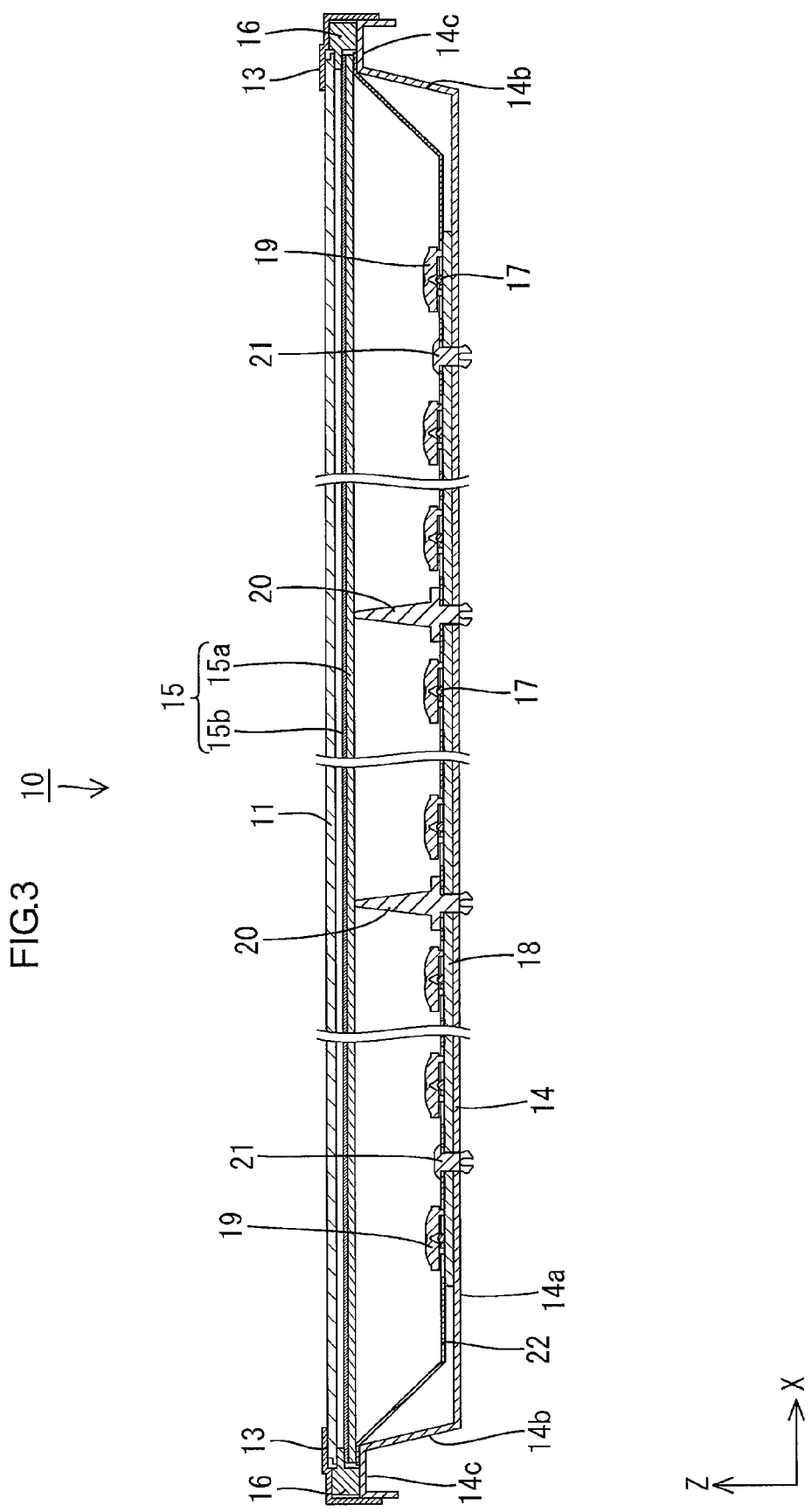
FIG. 3 is a cross-sectional view of the liquid crystal display device in FIG. 2 taken along a long side thereof.

The chassis 14 is made of metal. As illustrated in FIGS. 2 and 3, the chassis 14 includes a bottom plate 14a, side plates 14b, and a receiving plate 14c. The bottom plate 14a has a rectangular shape similar to the liquid crystal panel 11. The side plates 14b rise from respective outer edges of the bottom plate 14a. An overall shape of the chassis 14 is formed in a shallow box-like shape (shallow tray-like shape) opened to the front-surface side. Long sides of the chassis 14 match the X-axis direction (a horizontal direction) and short sides thereof match the Y-axis direction (a vertical direction). The frame 16 and the optical member 15 can be placed on the receiving plate 14c of the chassis 14 from the front-surface side. The optical member 15 will be explained later. The frame 16 is fixed to each receiving plate 14c with screws. Supporting pin mounting holes 14d and rivet mounting holes 14e are formed in the chassis 14 so as to correspond to the mounting positions of supporting pins 20 and the rivets 21, respectively.

As illustrated in FIG. 2, the optical member 15 is formed in a landscape rectangular in a plan view similar to the liquid crystal panel 11 and the chassis 14. As illustrated in FIG. 3, the outer edges of the optical member 15 are placed on the receiving plates 14c so as to cover the opening in the chassis 14 and arranged between the liquid crystal panel 11 and the LED units U.

The optical member 15 includes a diffuser plate 15a and an optical sheet 15b. The diffuser plate 15a is provided on the rear-surface side (the LED unit U side, a side opposite from the light exit side) and the optical sheet 15b is arranged on the front-surface side (the liquid crystal panel 11 side, the light exit side). The diffuser plate 15a includes a base member having a thickness and made of a substantially transparent synthetic resin and light scattering particles dispersed in the base member. The diffuser plate 15a has a function for diffusing light that traveling therethrough. The optical sheet 15b is formed in a sheet having a thickness smaller than that of the diffuser plate 15a. The optical sheet 15b may be selected from a diffuser sheet, a lens sheet, and a reflecting type polarizing sheet, whatever is appropriate.

As illustrated in FIG. 2, the frame 16 is formed in a frame shape along an outer peripheral part of the liquid crystal panel 11 and the optical member 15. As illustrated in FIG. 3, the frame 16 and each receiving plate 14c hold the outer peripheral part of the optical member 15 therebetween. The frame 16 receives a rear surface of the outer peripheral part of the liquid crystal panel 11. The bezel 13 is fixed to the front-surface side of the frame 16 with screws such that the frame 16 and the bezel 13 hold the outer peripheral part of the liquid crystal panel 11 therebetween.

Next, the LED unit U (light source unit) will be explained in detail. As illustrated in FIG. 2, the LED unit U has an elongated shape along the X-axis direction and a plurality of LED units U (nine LED units U in this embodiment) are arranged along the Y-axis direction. The LED unit U includes, as main components, the LEDs 17 (light sources) and an LED board 18 on which the LEDs 17 are mounted. The LED unit U further includes diffuser lenses 19 arranged on the LED board 18 so as to correspond to each LED 17. Each component of the LED unit U will be explained in the following.

The LED 17 is a point light source formed in a dot-like shape in a plan view. The LEDs 17 (seventeen in total in this embodiment) are arranged along the long-side direction (X-axis direction) of the LED board 18. The LED is prepared by sealing an LED chip with a resin material onto a base board that is fixed to the LED board 18. The LED chip that is mounted on the baseboard has one main light emission wavelength, and specifically, the LED chip that emits a single color of blue is used. On the other hand, a fluorescent material is dispersed in the resin material that seals the LED chip therein. The fluorescent material converts blue light emitted from the LED chip into white light. This enables the LED 17 to emit white light.

Figure 4:
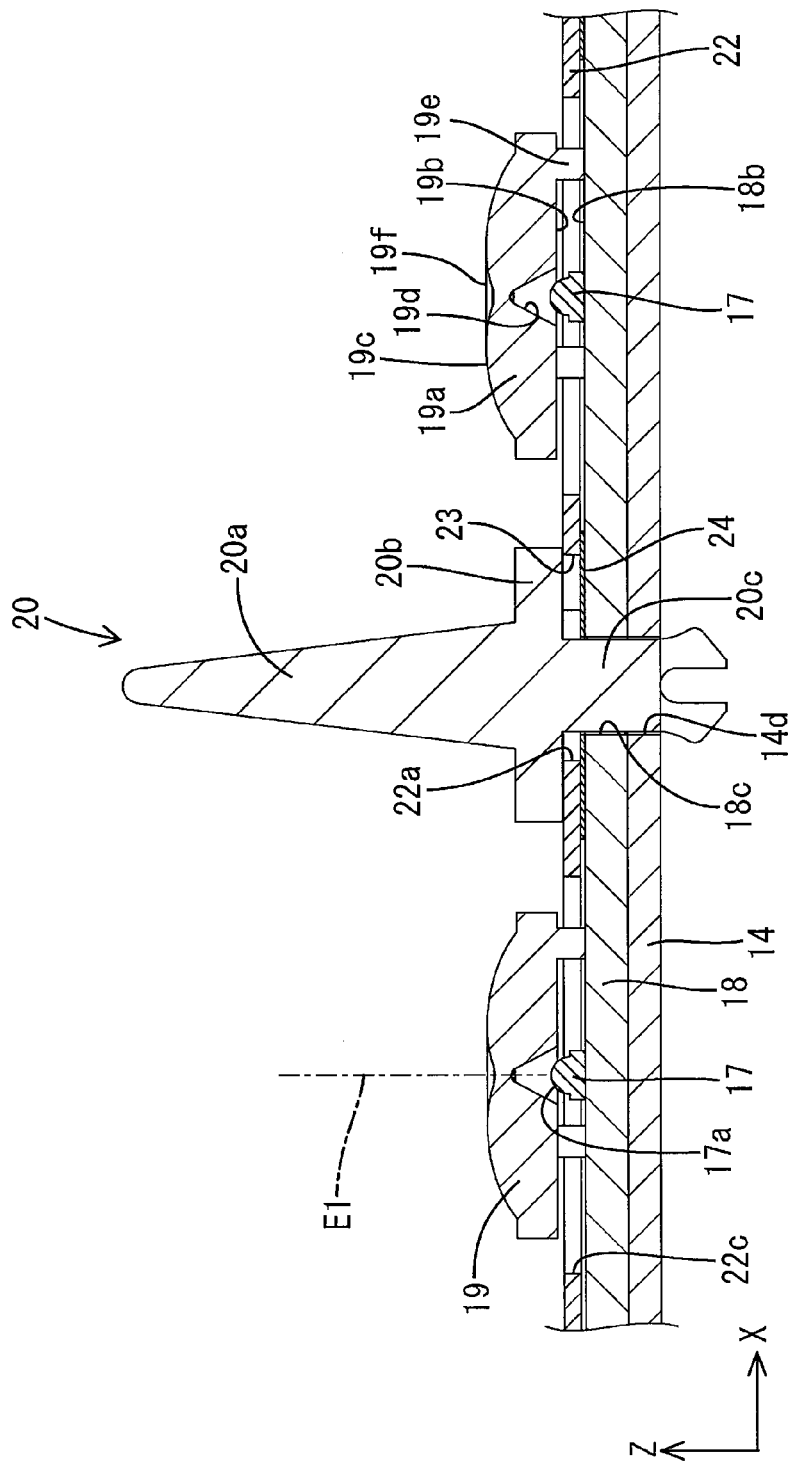
FIG. 4 is a magnified cross sectional view of FIG. 2 illustrating a supporting pin and therearound.

As illustrated in FIG. 4, the LED 17 is a top-type LED that has a light emitting surface 17a on a surface opposite from a mounting surface that is mounted to the LED board 18 (a surface that faces the front-surface side). A light axis E1 of light emitted from the LED 17 substantially matches the Z-axis direction (a direction perpendicular to main plate surfaces of the liquid crystal panel 11 and the optical member 15). Light emitted from the LED 17 radiates three-dimensionally around the light axis E1 within a specified angle range and the directivity thereof is higher than that of cold cathode tubes. Namely, the angle distribution of the LED 17 shows a tendency that the emission intensity of the LED 17 is high along the light axis E1 and decreases as the angle to the light axis E1 increases.

As illustrated in FIG. 2, each LED board 18 has a rectangular plan-view shape elongated along the X-axis direction. The LED board 18 is arranged in the chassis 14 along the bottom plate 14a with a long-side direction and a short-side direction thereof aligned to the X-axis direction and the Y-axis direction, respectively. The LEDs 17 are arranged on the bottom plate 14a of the chassis 14. Further, a connector portion 18a is provided at each long-side end of the LED board 18.

A board reflection sheet 18b is arranged on a front side surface of the LED board 18. The board reflection sheet 18b is made of a synthetic resin, for example, and has a surface having white color that provides high light reflectivity. Specifically, the board reflection sheet 18b is provided to overlap a lens through hole 22c formed in the chassis reflection sheet 22. Accordingly, the light entered a portion corresponding to each lens through hole 22c is reflected by the board reflection sheet 18b toward the diffuser lens 19 side. This improves the light use efficiency and thus improves the brightness. In other words, sufficient brightness is obtained with a smaller number of the LEDs 17 for cost reduction.

Supporting pin insertion holes 18c (board through hole) are formed in the LED board 18 corresponding to mounting positions of the supporting pins 20. Rivet insertion holes 18d (board through hole) are formed in the LED board 18 corresponding to mounting positions of the rivets 21. Around the supporting pin insertion holes 18c and the rivet insertion holes 18d in the LED board 18, colored portions 24 are provided so as to surround the supporting pin insertion holes 18c and the rivet insertion holes 18d.

Figure 8:
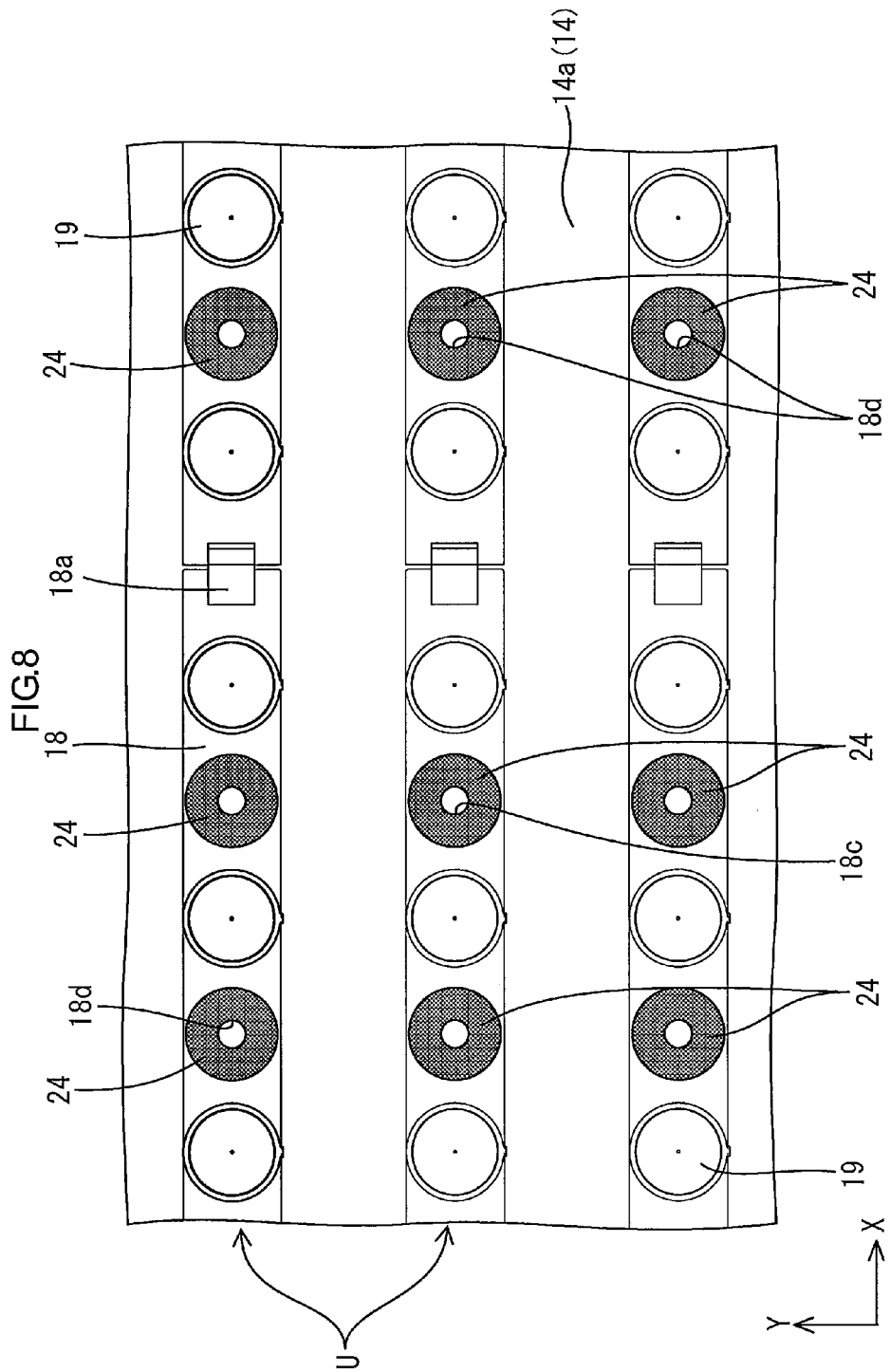
FIG. 8 is a magnified plan view of the liquid crystal display device without a reflection sheet in FIG. 7.

As illustrated in FIG. 8, the colored portions 24, each having a round shape in a plan view, are formed on the front-surface side of the LED board 18 by screen-printing with black paint. The colored portions 24 overlap openings 23 provided for identification purpose, supporting pin through holes 22a, and rivet through holes 22b in a chassis reflection sheet 22. The chassis reflection sheet 22 will be explained in detail later. The colored portions 24 and the chassis reflection sheet 22 have different colors so that the colored portions 24 are visually distinguished from the reflection sheet 22. Accordingly, during mounting of the supporting pins 20 and the rivets 21, parts of the colored portions 24 on the LED board 18 are visible through the openings 23, the supporting pin through holes 22a, and the rivet through holes 22b in the chassis reflection sheet 22. This improves the visibility of the openings 23, the supporting pin through holes 22a, and the rivet through holes 22b.

As illustrated in FIG. 4, each diffuser lens 19 is made of a synthetic resin (such as polycarbonate or acrylic) that is substantially transparent (has high light transmissivity) and has a refraction index higher than that of air. The diffuser lens 19 has a predetermined thickness and has a round shaped lens body 19a in a plan view. The diffuser lens 19 is mounted to the LED board 18 so as to cover each LED 17 from the front-surface side, that is, so as to overlap each LED 17 in a plan view. Projections 19 project from a lower surface 19b of the diffuser lens 19 at locations close to the periphery of the diffuser lens 19.

Three projections 19e are arranged along the periphery of the diffuser lens 19 at about equal intervals (at about 120 degree intervals) in a plan view. The projections 19e are fixed to a surface of the LED board 18, for example, with an adhesive or a thermosetting resin. A light entrance recess 19d is provided in a portion of a lower surface of the diffuser lens 19 (a surface facing the LED 17 and the LED board 18) that overlaps the LED 17 in a plan view. The light entrance recess 19d has a conical shape recessed toward the upper side. The light emitted from the LED 17 enters into the light entrance recess 19d. The lower surface of the diffuser lens 19 is roughened by grain finishing.

The upper surface (a surface facing the diffuser plate 15a) of the diffuser lens 19 has a middle portion that overlaps the LED 17 in a plan view. A recess 19f that is recessed toward the lower side is provided in the middle portion of the upper surface and thus the upper surface has a form of two connected gentle arcs. The upper surface is a light exit surface 19c. The light emitted from the LED 17 is refracted at an interface between an airspace and the light entrance recess 19d and at an interface between the light exit surface 19c and an airspace, thus the light is diffused planarly. Accordingly, the light emitted from the LED 17 exits from the light exit surface 19c toward the diffuser plate 15a side having a wide angle. Thus, the light having high directivity, which is emitted from the LED 17, can be diffused by the diffuser lens 19. In other words, the directivity of the light emitted from the LED 17 is lowered through the diffuser lens 19. Therefore, even if a distance between the adjacent LEDs 17 increases, the portion between the adjacent LEDs 17 is less likely to be recognized as a dark portion. Accordingly, the number of the LEDs 17 can be reduced.

In a portion of the light exit surface 19c that overlaps the LED 17 in a plan view, the amount of light from the LED 17 is far greater than in other portions and the brightness is locally high. This is because the recess 19f is formed in the middle portion of the upper surface of the diffuser lens 19. With this configuration, most of the rays of light emitted from the LED 17 are refracted at a wide angle and exit from the recess 19f. On the other hand, a part of the rays of light emitted from the LED 17 is reflected toward the LED board 18 side. Accordingly, the locally high brightness of the portion of the light exit surface 19c that overlaps the LED 17 is suppressed and thus uneven brightness is less likely to occur.

As illustrated in FIG. 2, a plurality of LED units U including the above components are aligned in the X-axis direction and in the Y-axis direction within the chassis 14. The LED units U are arranged parallel to each other such that the long-sides and the short-sides thereof are aligned, respectively. Namely, the LED units U (the LED boards 18) are arranged in rows and columns (in a matrix) within the chassis 14. The X-axis direction (the long-side direction of the chassis 14 and the LED board 18) corresponds to a row direction and the Y-axis direction (the short-side direction of the chassis 14 and the LED board 18) corresponds to a column direction. In other words, the LEDs 17 are arranged in rows and columns in the X-axis direction and the Y-axis direction (along a surface of the bottom plate 14a of the chassis 14).

Specifically, three LED units U are arranged parallel to each other in the X-axis direction within the chassis 14 and nine LED units are arranged parallel to each other in the Y-axis direction. Namely, twenty seven LED units U are arranged parallel to each other in the chassis 14. In this description, two kinds of LED boards 18 each having a different long-side dimension and having different number of LEDs 17 mounted thereon are used for the LED unit U. Specifically, types of the LED boards 18 include a six LEDs mounted-type and a five LEDs mounted-type. The six LEDs mounted-type LED board 18 has six LEDs mounted thereon and has a long-side dimension longer than that of the five LEDs mounted type. The five LEDs mounted-type LED board 18 has five LEDs mounted thereon and has a long-side dimension shorter than the six LEDs mounted type. The six LEDs mounted-type LED boards 18 are arranged on each end portion of the chassis 14 in the X-axis direction and the five LEDs mounted-type LED boards 18 are arranged in a middle portion of the chassis 14 in the X-axis direction.

The LED boards 18 that are arranged in the X-axis direction to form a row are connected to each other with the adjacent connector portions 18a engaged, which establishes electrical connection to each other. The connector portions 18a located at the ends of the chassis 14 in the X-axis direction are electrically connected to an external control circuit (not illustrated). Accordingly, the LEDs 17 arranged on each of the LED boards 18 that are arranged in the row are connected in series. Thus, turning on and off of the LEDs 17 included in one row of the LED boards 18 can be collectively controlled by one control circuit. This can reduce costs. The LED boards 18 having different long-side dimensions and different number of LEDs 17 mounted thereon have a same short-side dimension and same arrangement intervals of the LEDs 17.

Thus, a plurality of kinds of the LED boards 18 having different long-side dimensions and different number of LEDs 17 mounted thereon are prepared to be used by combining the different kinds of LED boards 18 appropriately. Accordingly, following advantageous effects can be obtained. In manufacturing a plurality of types of liquid crystal display devices 10 having different screen sizes, whether each kind of LED boards 18 is used or not is effectively determined and the number of LED board 18 for each kind can be changed according to each screen size. Compared to a case of preparing LED boards, which are exclusively designed for each chassis 14 of every screen size and have long-side dimensions same as the chassis 14, the kind of the LED boards 18 that is necessary for manufacturing decrease and this lowers the manufacturing cost.

In addition to the two kinds of LED boards 18 (the five LEDs mounted-type LED board 18 and the six LEDs mounted-type LED board 18), an eight LEDs mounted-type LED board 18 having eight LEDs 17 are mounted thereon may be used. The three kinds of LED boards 18 may be combined appropriately to be used for easily manufacturing liquid crystal display devices 10 having different screen sizes of 26 inches, 32 inches, 37 inches, 40 inches, 42 inches, 46 inches, 52 inches, and 65 inches with low costs.

As illustrated in FIG. 3, the chassis reflection sheet 22 is arranged to the front-surface side of the LED board 18. The chassis reflection sheet 22 and the LED board 18 are fixed to the bottom plate 14a of the LED board 18 with the supporting pins 20 and the rivets 21. The supporting pins 20 hold the optical member 15 from the lower side.

The chassis reflection sheet 22 (a reflection sheet) has a size large enough to cover almost entire inner surface of the chassis 14. The chassis reflection sheet 22 is made of a synthetic resin, and has a surface having white color that provides high light reflectivity. As illustrated in FIG. 2, a bottom of the chassis reflection sheet 22 has a substantially rectangular shape in a plan view. The supporting pin through hole 22a, that is, a first through hole, is formed in the chassis reflection sheet 22 corresponding to the mounting position of the supporting pin 20. The rivet through hole 22b, that is, a second through hole, is formed in the chassis reflection sheet 22 corresponding to the mounting position of the rivet 21.

Figure 7:
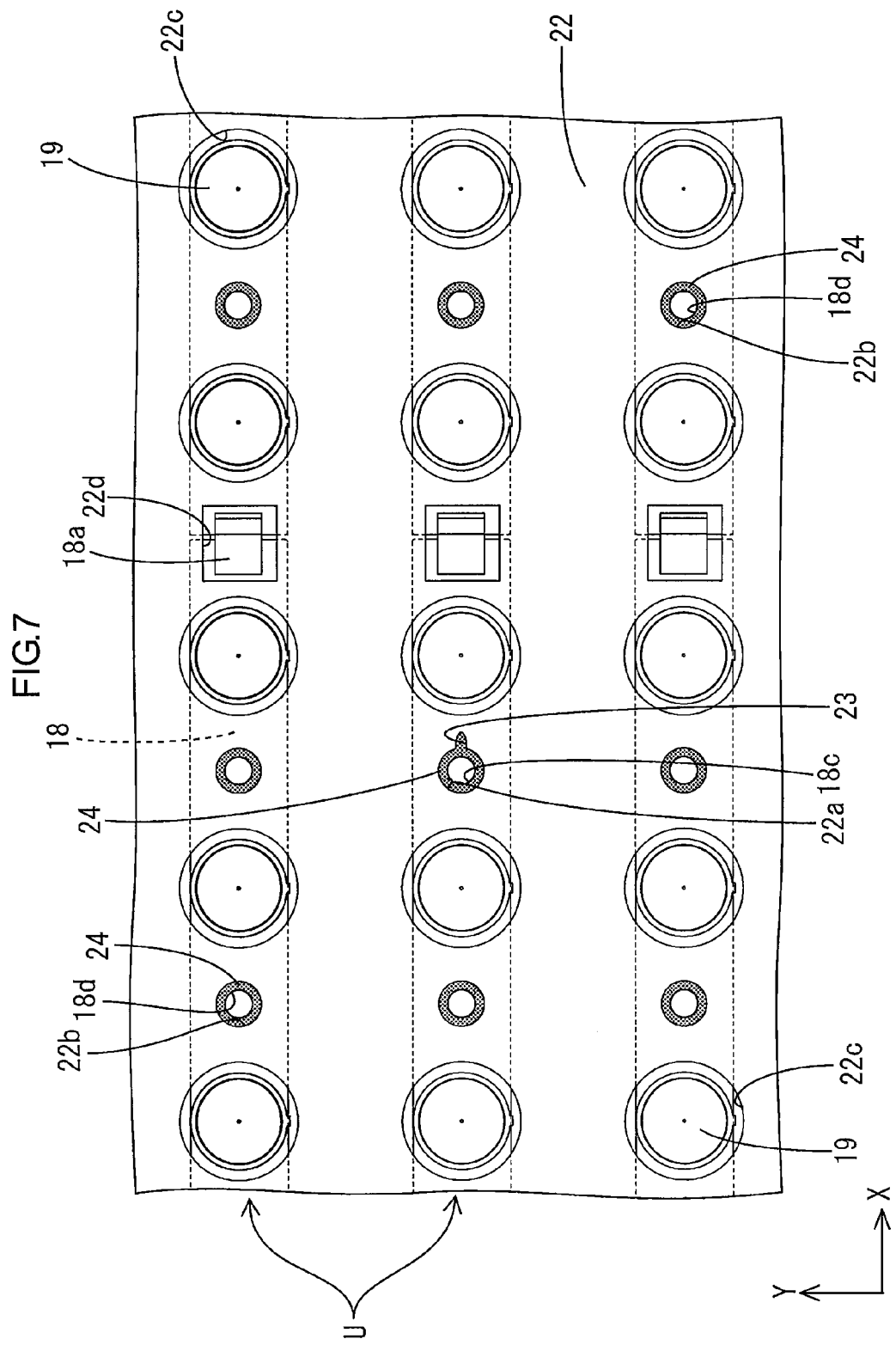
FIG. 7 is a magnified plan view of the liquid crystal display device without the supporting pin and the rivet in FIG. 6.

As illustrated in FIG. 7, each supporting pin through hole 22a (a first through hole), which is formed in a round shape in a plan view, has a diameter greater than that of the supporting pin insertion hole 18c formed in the LED board 18. Each the rivet through holes 22b (a second through hole), which is formed in a round shape in a plan view, has a diameter greater than that of the rivet insertion hole 18d formed in the LED board 18. The openings 23 are arranged adjacent to the supporting pin through holes 22a.

As illustrated in FIG. 7, the opening 23 is formed in an elliptical shape and arranged adjacent to the supporting pin through holes 22a. For example, the opening 23 continues to the adjacent supporting pin through hole 22a having a round shape. The opening 23 is of a size to be covered by a flange portion 20b of the supporting pin 20 when the supporting pin 20 is mounted to the chassis 14 through the supporting pin through hole 22a and the supporting pin insertion hole 18c. On the other hand, the size of the opening 23 is such that at least a part of the opening 23 is visible when the rivet 21 is mounted to the chassis 14 through the supporting pin through hole 22a and the supporting pin insertion hole 18c. The supporting pin 20 will be explained later.

The lens through holes 22c are formed in the bottom of the chassis reflection sheet 22 corresponding to the diffuser lenses 19 that are mounted on each the LED unit U. Each lens through hole 22c, which is formed in a round shape in a plan view, has a diameter greater than that of the diffuser lens 19. Connector through holes 22d are formed in the bottom of the chassis reflection sheet 22 corresponding to the connector portions 18a. Each connector through hole 22d, which is formed in a rectangular shape in a plan view, has a diameter greater than that of the connector portion 18a. Accordingly, in arranging the chassis reflection sheet 22 on the chassis 14, even if a dimension error occurs, each diffuser lens 19 can be properly fitted in each lens fitting hole 22b, and each connector portion 18 can be properly fitted in each connector through hole 22d.

As illustrated in FIGS. 2 and 4, the supporting pins 20 are positioned about the center of the bottom plate 14a of the chassis 14. Each supporting pin 20 is made of a synthetic resin, and has a surface having white color that provides high light reflectivity. The supporting pin 20 includes a pillar portion 20a, the flange portion 20b, and a fixing portion 20c. The pillar portion 20a extends toward the front-surface side (Z-axis direction) from an upper surface of the chassis reflection sheet 22. A distal end portion of the pillar portion 20a is to be in contact with the optical member 15 and to restrict warping of the optical member 15. The flange portion 20b extends from a periphery of a base end of the pillar portion 20a toward outside in a horizontal direction. The fixing portion 20c projects from the flange portion 20b toward an opposite direction of the pillar portion 20a. The fixing portion 20c is fixed to the chassis 14 through the supporting pin insertion hole 18c and the supporting pin mounting hole 14d.

The pillar portion 20a has a conical shape. The pillar portion 20a supports the diffuser plate 15 from the backside with the distal end that comes in point contact with the diffuser plate 15a when the diffuser plate 15a is bent downward. Accordingly, the optical member 15 is less likely to be bent toward the chassis 14 side and the optical member 15 can be held with high accuracy in the backlight device 12. As a result, uneven brightness is less likely to occur.

Each flange portion 20b has a disk-like shape and has a diameter greater than that of the supporting pin through hole 22a. When the supporting pin 20 is mounted to the chassis 14, the flange portion 20b covers the supporting pin through hole 22a and the opening 23 for distinguishing between the supporting pin through hole 22a and the rivet through hole 22b. A slight gap is provided between the flange portion 20b and the chassis reflection sheet 22 such that the chassis reflection sheet 22 is less likely to be lifted from the chassis 18.

The end portion of the fixing portion 20c is a wide portion that elastically changes the shape thereof. The end portion of the fixing portion 20c is passed through the supporting pin through hole 22a, the supporting pin insertion hole 18c, and the supporting pin mounting hole 14d, and fixed to the chassis 14. Specifically, the supporting pin insertion hole 18c is formed through the LED board 18 at a position corresponding to the supporting pin through hole 22a in the chassis reflection sheet 22 such that the fixing portion 20c passes through the LED board 18. The supporting pin mounting hole 14d is formed through the bottom plate 14a of the chassis 14 such that the supporting pin mounting hole 14d is communicated with the supporting pin insertion hole 18c. The fixing portion 20c can be stopped at the rear surface of the bottom plate 14a of the chassis 14 by passing through the supporting pin through hole 22a, the supporting pin insertion hole 18c, and the supporting pin mounting hole 14d.

Figure 5:
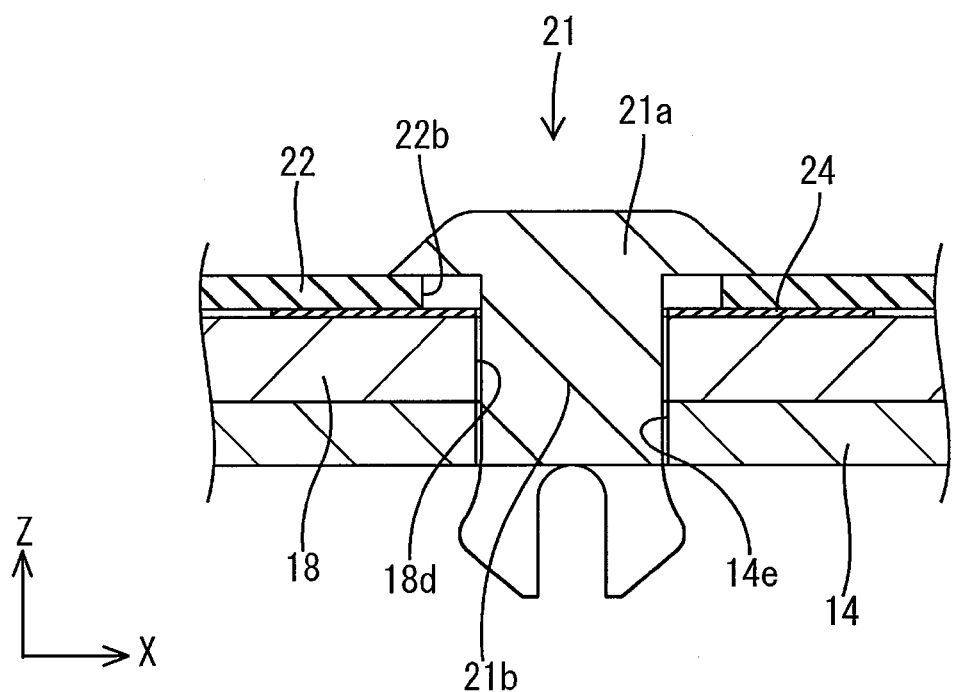
FIG. 5 is a magnified cross sectional view of FIG. 2 illustrating a rivet and therearound.

As illustrated in FIGS. 2 and 5, the rivets 21 are arranged to the bottom plate 14a of the chassis 14 along the LED boards 18. Each rivet 21 is made of a synthetic resin, and has a surface having white color that provides highlight reflectivity. The rivet 21 includes a head portion 21a and a fixing portion 21b. The head portion 21a has a disk-like shape and has a diameter greater than that of the rivet through hole 22b in the chassis reflection sheet 22. The fixing portion 21b projects from the center of head portion 21a toward the lower side.

The head portion 21a has a disk-like shape and has a diameter greater than that of the rivet through hole 22b in the chassis reflection sheet 22. When the rivet 21 is mounted to the chassis 14, the head portion 21a covers the rivet through hole 22b. A slight gap is provided between the head portion 21a and the chassis reflection sheet 22 such that the chassis reflection sheet 22 is less likely to be lifted from the chassis 18. The head portion 21a has a diameter smaller than that of the flange portion 20b of the supporting pin 20. Accordingly, at least a part of the opening 23 provided for identification purpose is visible if the rivet 21 is improperly mounted to the supporting pin through hole 22a.

The end portion of the fixing portion 21b is a wide portion that elastically changes the shape thereof. The end portion of the fixing portion 21b is passed through the rivet through hole 22b, the rivet insertion hole 18d, and the rivet mounting hole 14e, and fixed to the chassis 14. Specifically, the rivet insertion holes 18d are formed through the LED board 18 at a position corresponding to the rivet through holes 22b in the chassis reflection sheet 22. Thus, each fixing portion 21b passes through the LED board 18. Further, the rivet mounting holes 14e are formed through the bottom plate 14a of the chassis 14 such that the rivet mounting holes 14e are communicated with the rivet insertion holes 18d. Each fixing portion 21b can be stopped at the rear surface of the bottom plate 14a of the chassis 14 by passing through the rivet through hole 22b, the rivet insertion hole 18d, and the rivet mounting hole 14e.

Next, an assembly procedure of the backlight device 12 will be explained with reference to FIGS. 6 to 8. The chassis 14 is placed on a workbench, and as illustrated in FIG. 8, the LED boards 18 are arranged at predetermined positions on the bottom plate 14a of the chassis 14. The LED boards 18 that are arranged adjacent to each other in the X-axis direction are connected at connector portions 18a. The supporting pin insertion holes 18c in the LED board 18 correspond to the supporting pin mounting holes 14d in the chassis 14. The rivet insertion holes 18d in the LED board 18 correspond to the rivet mounting holes 14e in the chassis 14. The LEDs 17 are mounted on the LED board 18 and the diffuser lenses 19 are mounted to the LED board 18 so as to cover the respective LEDs 17.

As illustrated in FIG. 7, the chassis reflection sheet 22 is placed on the front-surface side of the LED board 18. The diffuser lenses 19 are passed through the lens through holes 22c in the chassis reflection sheet 22 and the connector portions 18a are passed through the connector through holes 22d in the chassis reflection sheet 22. The openings 23 provided for identification purpose overlaps the colored portions 24 on the LED board 18 so that parts of the colored portions 24 are visible through the openings 23. The supporting pin through holes 22a in the chassis reflection sheet 22 correspond to the supporting pin insertion holes 18c in the LED board 18. Thus, parts of the colored portions 24 arranged on the LED board 18 are visible along each of peripheral edges of the supporting pin through holes 22a in the chassis reflection sheet 22. Further, the rivet through holes 22b correspond to the rivet insertion holes 18d in the LED board 18. Thus, parts of the colored portions 24 are visible along each of peripheral edges of the rivet through holes 22b in the chassis reflection sheet 22.

Figure 6:
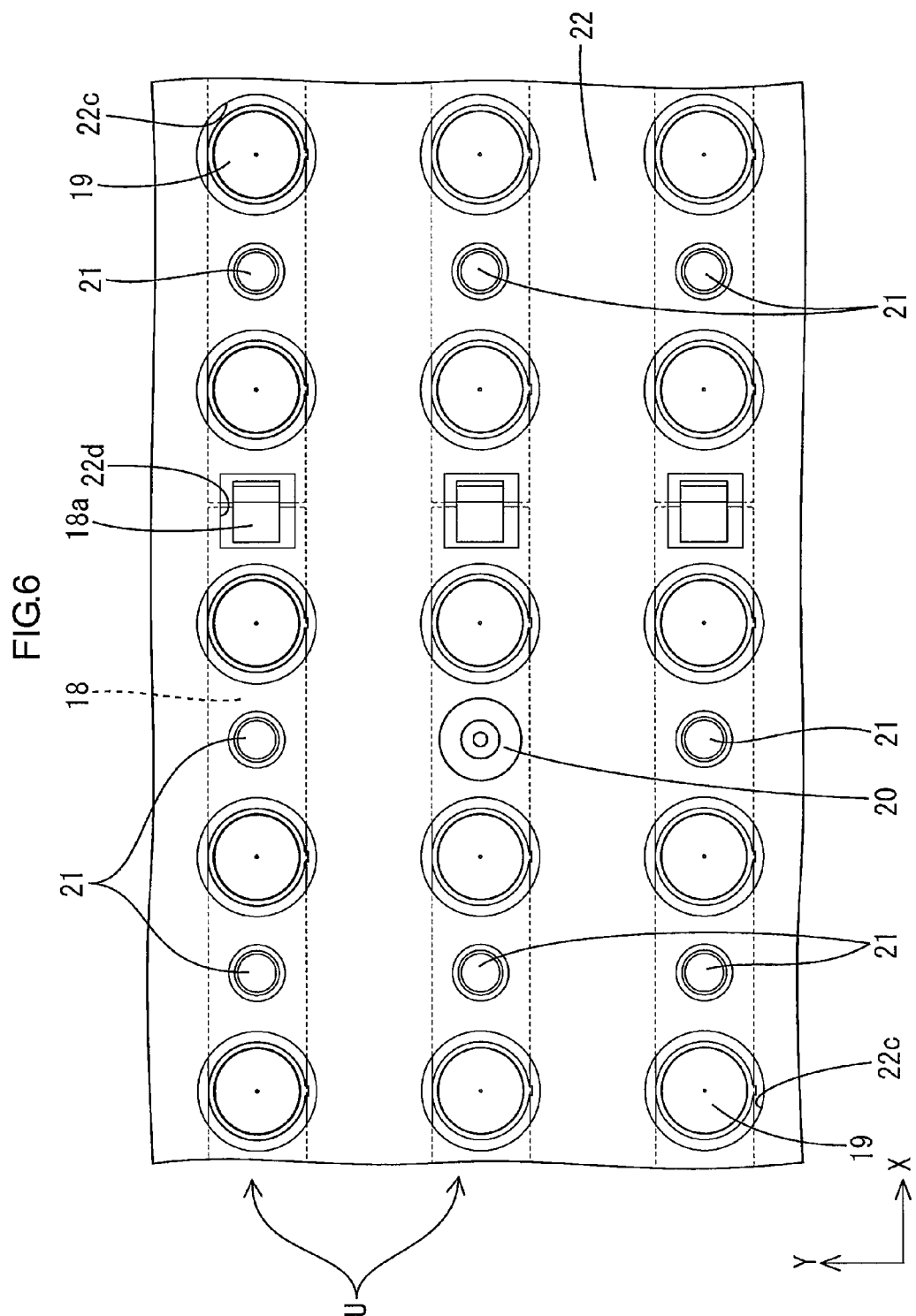
FIG. 6 is a magnified plan view of the supporting pin and therearound according to the first embodiment.

After the chassis reflection sheet 22 is set, the supporting pins 20 and rivets 21 are mounted as illustrated in FIG. 6. First, the rivet through holes 22b are visually recognized that there are no openings 23 provided for identification purpose nearby. Then, the rivets 21 are inserted through the rivet through holes 22b. After all rivets 21 are mounted, the supporting pin through holes 22a that have the openings 23 provided for identification purpose nearby are visually recognized and the supporting pins 20 are inserted through the supporting pin through holes 22a. Specifically, each fixing portion 21b of the rivet 21 is inserted through each rivet through hole 22b in the chassis reflection sheet 22 and each rivet insertion hole 18d in the LED board 18. Accordingly, the fixing portion 21b of the rivet 21 is stopped at the rivet mounting hole 14e in the chassis 14. Each fixing portion 20c of the supporting pin 20 is inserted through each supporting pin through hole 22a in the chassis reflection sheet 22 and each supporting pin insertion hole 18c in the LED board 18. Accordingly, the fixing portion 20c of the supporting pin 20 is stopped at the supporting pin mounting hole 14d in the chassis 14.

Next, effects of the first embodiment will be explained. First, because the colored portions 24 are arranged on the LED boards 18, respectively, the visibility of the openings 23, which are formed in the chassis reflection sheet 22 provided for identification purpose, is improved and the supporting pin through holes 22a and the rivet through holes 22b can be properly recognized. Thus, improper mounting of the supporting pins 20 and the rivets 21, which may result in uneven brightness, is less likely to occur. Specifically, as illustrated in FIG. 7, parts of the black colored portions 24 are visible through the openings 23 in the white colored chassis reflection sheet 22. As a result, the visibility of the openings 23 is improved and the presence or absence of the openings 23 is easily recognized. If the colored portions 24 are not arranged, the openings 23 is hardly recognized because the front-surface side of the LED board 18 and the chassis reflection sheet have similar colors. Herein, if the rivet 21 is improperly mounted to the supporting pin through hole 22a, the optical member 15 may be bent toward the chassis 14 side and uneven brightness may occur. If the supporting pin 20 is improperly mounted to the rivet through hole 22, the pillar portion 20a of the supporting pin 20 may affect a light path in the back light device 12 and may cause uneven brightness. However, in this description, the improper mounting of the supporting pins 20 and the rivets 21 can be reduced. Therefore, uneven brightness, which is caused when the supporting pins 20 are not mounted to predetermined positions or when mounted in improper positions, is less likely to occur.

Figure 9:
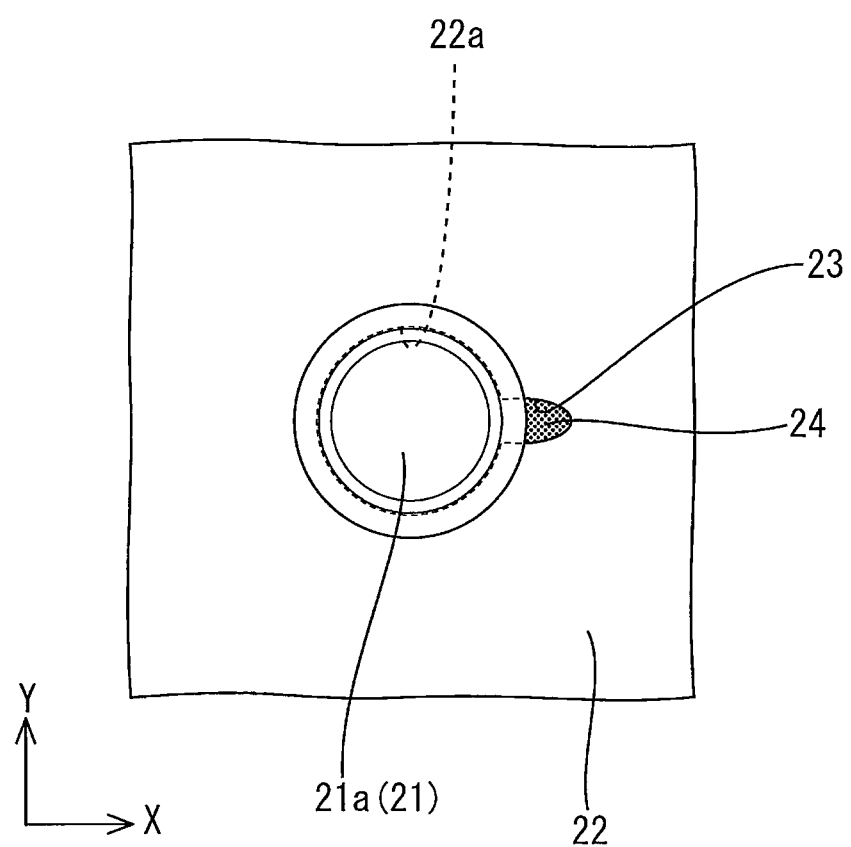
FIG. 9 is a magnified plan view illustrating a supporting pin through hole with the rivet being fitted therein.
Figure 10:
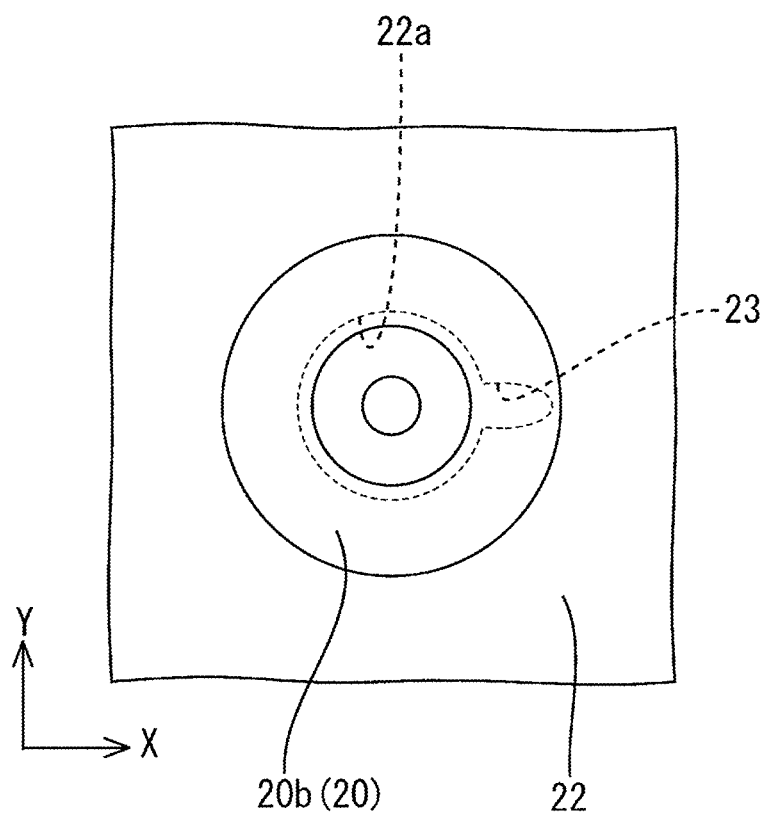
FIG. 10 is a magnified plan view illustrating a supporting pin through hole with the supporting pin being fitted therein.

When the rivet 21 is mistakenly mounted to the chassis 14 through the supporting pin through hole 22a and the supporting pin insertion hole 18c, parts of the opening 23 and the colored portion 24 are visible and the improperly mounted rivet 21 can be recognized visually. Accordingly, the improper mounting of the rivet 21 to the supporting pin through hole 22a can be restricted or suppressed and thus uneven brightness, which is caused by improper mounting, is less likely to occur. Specifically, as illustrated in FIGS. 9 and 10, each head portion 21a of the rivet has a diameter smaller than that of the flange portion 20b of the supporting pin 20. Further, each opening 23, which is formed adjacent to the supporting pin through hole 22a, is covered by the flange portion 20c when the supporting pin 20 is mounted to the chassis 14 through the supporting pin through hole 22a and the supporting pin insertion hole 18c. On the other hand, at least a part of the opening 23 is visible when the rivet 21 is mounted to the chassis 14 through the supporting pin through hole 22a and the supporting pin insertion hole 18c. With this configuration, as illustrated in FIG. 9, if the rivet 21 is mistakenly mounted to the supporting pin through hole 22a, parts of the opening 23 and colored portion 24 are visible and the improperly mounted rivet 21 can be visually recognized. Therefore, the mistake can be immediately corrected and the supporting pin 20 is properly mounted to the supporting pin through hole 22a. Thus, the uneven brightness caused by the bending of the optical member 15 is less likely to occur.

In assembly procedure of the backlight device 12, the rivets 21 are mounted at first and then the supporting pins 20 are mounted. This can reduce the improper mounting of the supporting pins 20 being mounted to the chassis 14 through the rivet through holes 22b and the rivet insertion holes 18d. Thus, the uneven brightness caused by the improper mounting is less likely to occur. If the supporting pin 20 is improperly mounted to the chassis 14 through the rivet through hole 22b and the rivet insertion hole 18d, the improper mounting is hardly recognized since the supporting pin 20 covers the river through hole 22b and the colored portion 24 with the flange portion 20b. In this description, all rivet through holes 21 are provided with rivets 21 before the supporting pins 20 are mounted. Therefore, the supporting pin 20 is less likely to be inserted to the rivet through hole 22b. Thus, uneven brightness, which is caused when the supporting pin 20 is mounted to an improper position and the pillar portion 20a of the supporting pin 20 affects the light path in the back light device 12, is less likely to occur.

The colored portions 24 overlap not only the openings 23 for identification purpose but also the supporting pin through holes 22a and the rivets 22b. With this configuration, the visibility of the supporting pin through holes 22a and the rivet through holes 22b is improved as well as that of the opening 23 provided for identification purpose. Therefore, the mounting workability of the supporting pins 20 and the rivets 21 is improved. More specifically, parts of the colored portions 24 are visible along each of the peripheral edges of the supporting pin through holes 22a and the rivet through holes 22b. Therefore, the mounting positions of the supporting pins 20 and the rivets 21 are easily recognized and this improves the mounting workability. In this description, one hundred and six rivets 21 and two supporting pins 20 are arranged. If any of the rivet through holes 22b or the supporting pin through holes 22a is not received the rivet 21 or the supporting pin 20, a part of the colored portion 24 become visible therethrough. Therefore, the supporting pin through hole 22a or the rivet through hole 22b that remains open can be easily recognized and the rivet 21 or the supporting pin 20 can be properly inserted thereto.

Further, the colored portions 24 are formed on the LED board 18 by printing so that the colored portions 24 can be easily formed. For example, after the LED board 18 is assembled, characters and symbols, which are not illustrated in this description, may be printed on a part of the LED board 18 where the chassis reflection sheet 22 covers. The characters and symbols may include a lead-free symbol, a UL mark, board information, and flame resistant information. By forming the colored portions 24 at the same time of printing the characters and symbols using the same ink, the colored portions 24 can be formed without requiring special processes and man-hours. The LED board 18 may not include the printed characters or symbols. In that case, only the colored portions 24 may be formed by printing.

Second Embodiment

Figure 11:
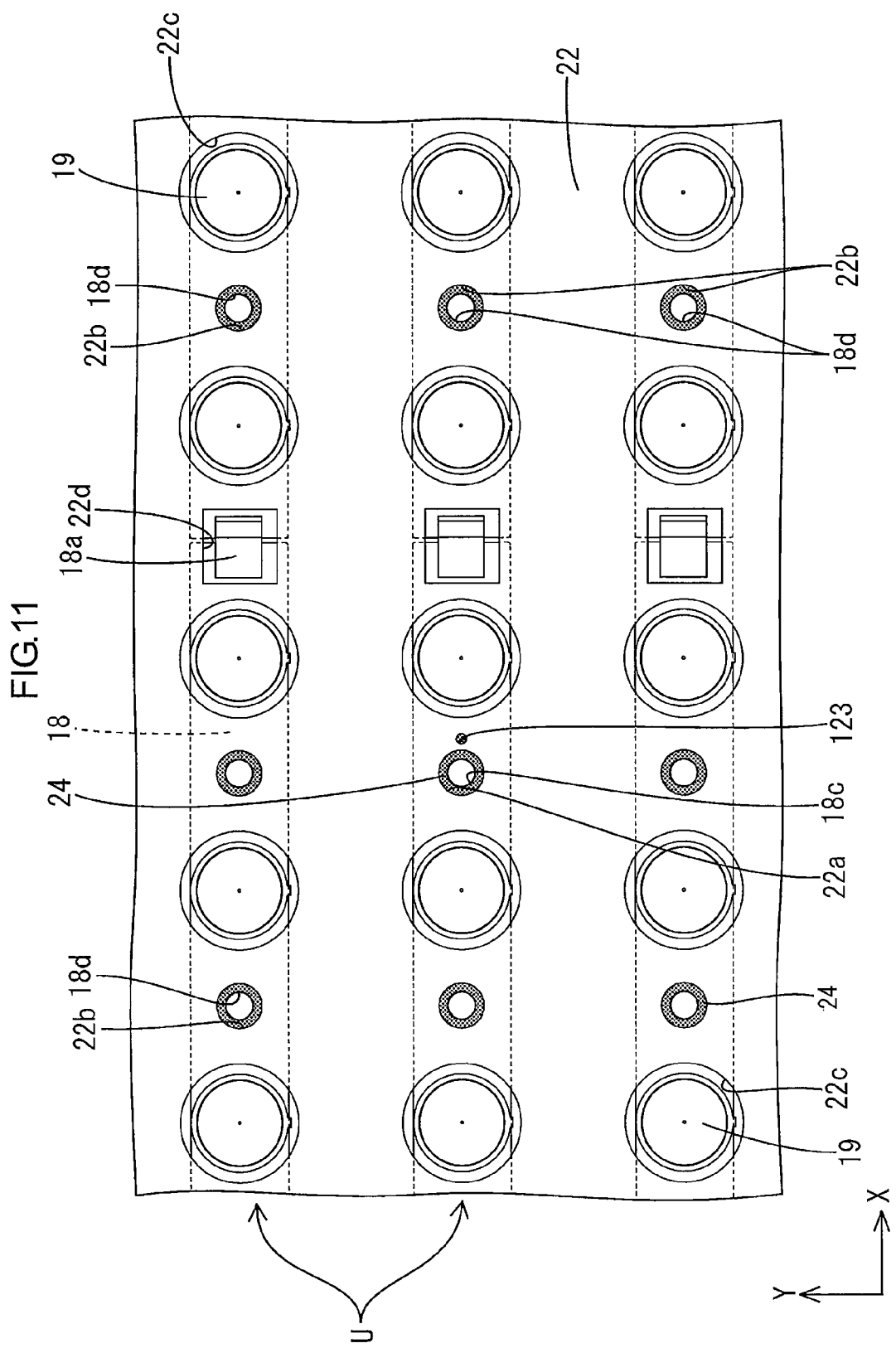
FIG. 11 is a magnified plan view of the liquid crystal display device without a supporting pin and a rivet according to the second embodiment.

A second embodiment of this invention will be explained with reference to FIG. 11. The shape and the arrangement of an opening 123 are changed from the first embodiment. Other configurations are the same as the first embodiment. The same parts as those in the first embodiment will be indicated by the same symbols and will not be explained.

Openings 123 are formed in round shapes in a plan view and provided adjacent to the supporting pin through holes 22a. Each opening 123 is of a size to be covered by a flange portion 20b of the supporting pin 20 when the supporting pin 20 is mounted to the chassis 14 through the supporting pin through hole 22a and the supporting pin insertion hole 18c. On the other hand, the size of the opening 123 is such that at least a part of the opening 123 is visible when the rivet 21 is mounted to the chassis 14 through the supporting pin through hole 22a and the supporting pin insertion hole 18c. With this configuration, because the colored portion 24 is arranged on the LED board 18, the visibility of the openings 123 formed in the chassis reflection sheet 22 is improved and the supporting pin through holes 22a and the rivet through holes 22b can be properly recognized. Therefore, improper mounting of the supporting pins 20 and the rivets 21, which may result in uneven brightness, is less likely to occur.

Third Embodiment

Figure 12:
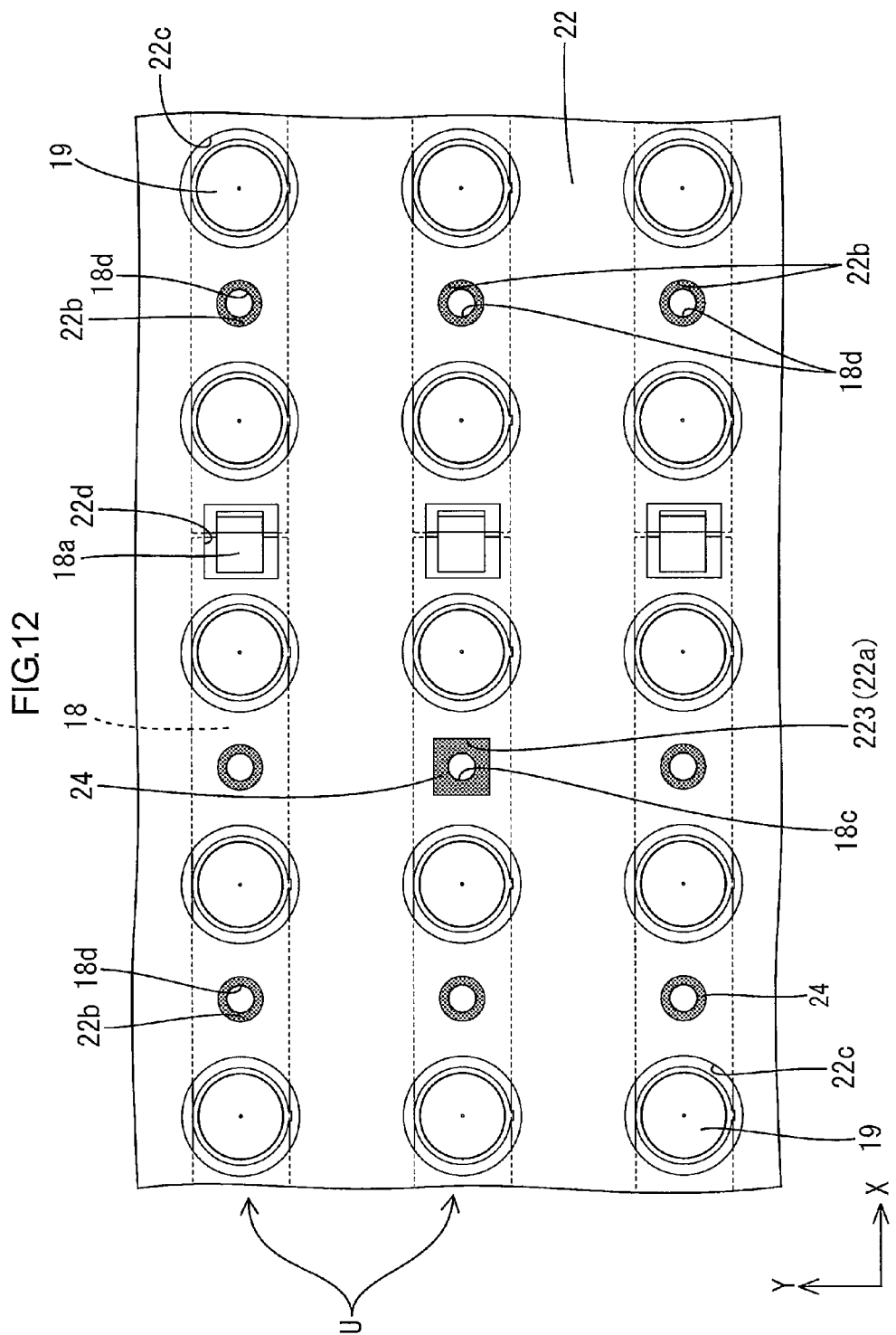
FIG. 12 is a magnified plan view of the liquid crystal display device without a supporting pin and a rivet according to the third embodiment.

A third embodiment of this invention will be explained with reference to FIG. 12. The shape and the arrangement of an opening 223 are changed from the first embodiment. Other configurations are the same as the first embodiment. The same parts as those in the first embodiment will be indicated by the same symbols and will not be explained.

Openings 223 are provided adjacent to the supporting pin through holes 22a and formed in rectangular shapes together with the supporting pin through holes 22a in a plan view. In other words, four cutouts are provided at an outer periphery of each supporting pin through hole 22a and integrally formed an opening having a rectangular shape with the supporting pin through hole 22a. The opening 223 is of a size to be covered by a flange portion 20b of the supporting pin 20 when the supporting pin 20 is mounted to the chassis 14 through the supporting pin through hole 22a and the supporting pin insertion hole 18c. On the other hand, the size of the opening 223 is such that at least apart of the opening 223 is visible when the rivet 21 is mounted to the chassis 14 through the supporting pin through hole 22a and the supporting pin insertion hole 18c. With this configuration, because the colored portions 24 are arranged on the LED board 18, the visibility of the openings 223 formed in the chassis reflection sheet 22 is improved and the supporting pin through holes 22a and the rivet through holes 22b can be properly recognized. Therefore, improper mounting of the supporting pins 20 and the rivets 21, which may result in uneven brightness, is less likely to occur.

Forth Embodiment

A forth embodiment of this invention will be explained with reference to FIGS. 13 to 15. The differences between the first embodiment and this embodiment are that temporary fixing members 25 are further provided in this embodiment and that the colored portions 24 are not arranged at surrounding areas of the temporary fixing member insertion holes 18e through which the temporary fixing members are inserted. The temporary fixing members 25 fix the LED boards 18 to the chassis 14. Other configurations are the same as the first embodiment. The same parts as those in the first embodiment will be indicated by the same symbols and will not be explained.

A plurality of LED units U (light source unit) each including LEDs 17 (light emitting diodes) as light sources are held in the chassis 14. Further, the supporting pins 20, the rivets 21, and the temporary fixing members 25 are arranged inside the chassis 14. The supporting pins 20 support the optical member 15 and hold LED boards 18. The rivets 21 hold the chassis reflection sheet 22 and the LED boards 18. The temporary fixing members 25 hold the LED boards 18.

The supporting pin mounting holes 14d and the rivet mounting holes 14e are formed in the chassis 14 corresponding to the mounting positions of the supporting pins 20 and the rivets 21, respectively. Temporary fixing member mounting holes are formed (not illustrated) corresponding to the mounting positions of the temporary fixing members 25.

Figure 15:
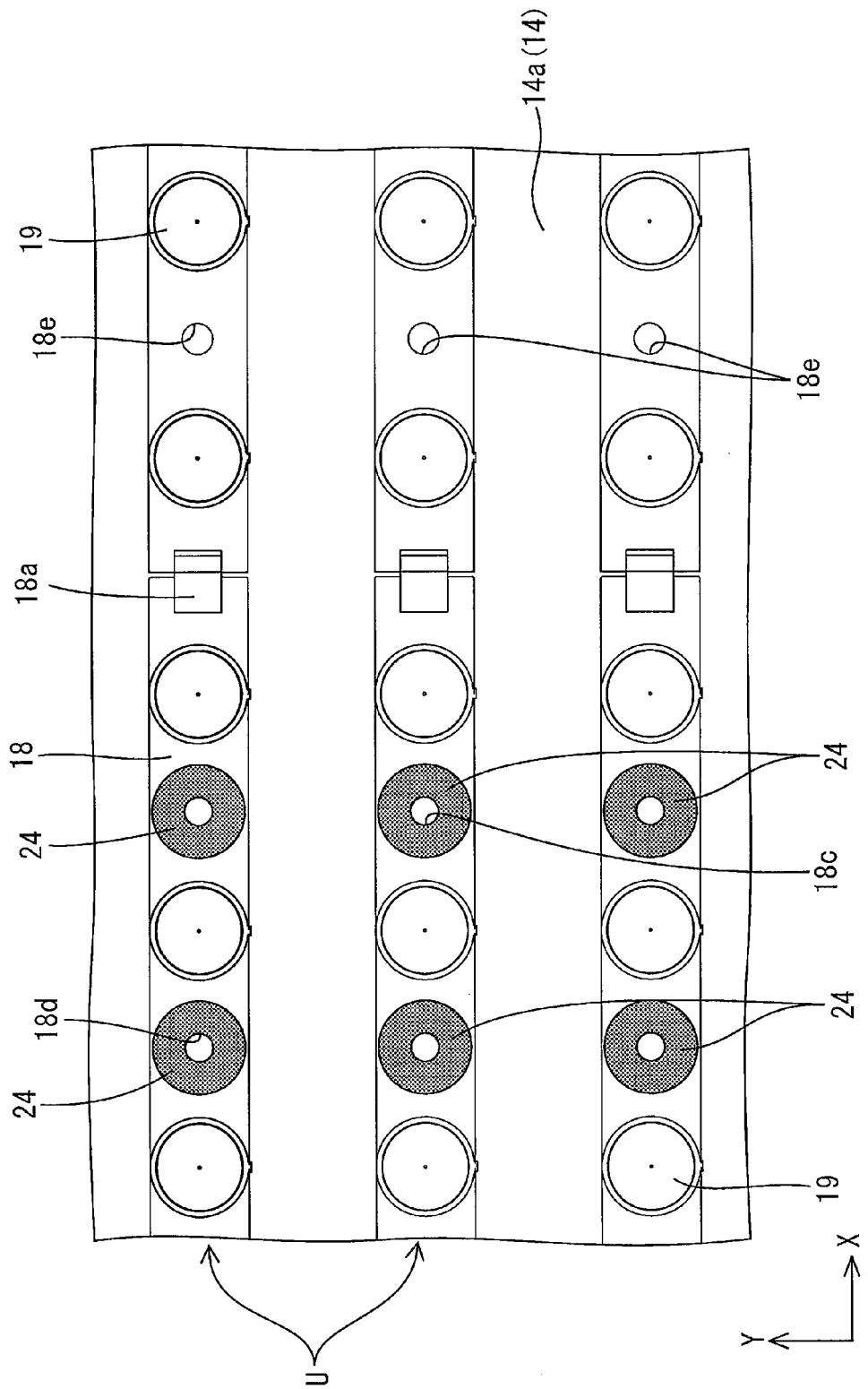
FIG. 15 is a magnified plan view of the liquid crystal display device without a reflection sheet and a temporary fixing member in FIG. 13.

As illustrated in FIG. 15, the supporting pin insertion holes 18c are formed in the LED board 18 corresponding to the mounting positions of the supporting pins 20. The rivet insertion holes 18d are formed in the LED board 18 corresponding to the mounting positions of the rivets 21. The colored portions 24 are arranged by coloring overall surrounding areas of the supporting pin insertion holes 18c and the rivet insertion holes 18d in the LED board 18. The temporary fixing member insertion holes 18e are formed on the LED board 18 corresponding to the mounting positions of the temporary fixing members 25. The colored portions 24 are not arranged at the surrounding areas of the temporary fixing member insertion holes 18e. Namely, the surrounding areas of the temporary fixing member insertion holes 18e are in colors different from those of the colored portions 24 such that the temporary fixing member insertion holes 18e are distinguished from the colored portions 24.

Figure 14:
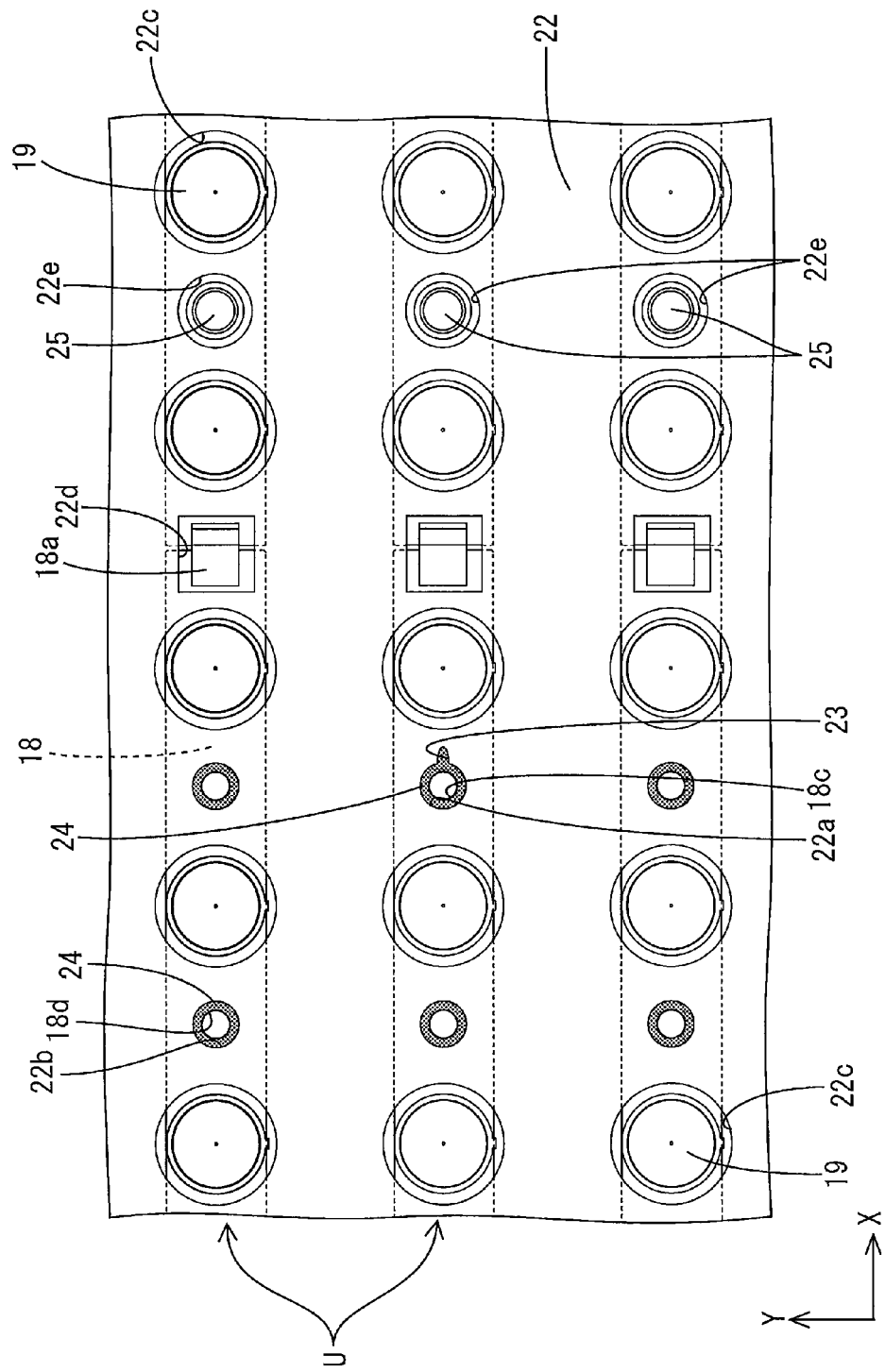
FIG. 14 is a magnified plan view of the liquid crystal display device without the supporting pin and the rivet in FIG. 13.

As illustrated in FIG. 14, temporary fixing member through holes 22e, the lens through holes 22c, and the connector through holes 22d formed in the bottom of the chassis reflection sheet 22 correspond to the temporary fixing members 25, the diffuser lenses 19 mounted on the LED unit U, and connector portions 18a, respectively. Each of the temporary fixing member through holes 22e, which is formed in a rectangular shape in a plan view, has a diameter greater than that of the temporary fixing member 25. Accordingly, in arranging the chassis reflection sheet 22 on the chassis 14, even if a dimension error occurs, the temporary fixing member 25, the diffuser lens 19, and the connector portion 18 can be properly fitted in the temporary fixing member through hole, the lens fitting hole 22b, and the connector through hole 22d, respectively.

Temporary fixing members 25 are arranged at predetermined positions on the bottom plate 14a of the chassis 14 corresponding to the LED boards 18. Each temporary fixing member 25 is made of a synthetic resin, and has a surface having white color that provides high light reflectivity. The temporary fixing member 25 includes a head portion having a disk-like shape and a fixing portion projecting from the center of head portion toward the lower side. The end portion of the fixing portion of temporary fixing member 25 is a wide portion that elastically changes the shape thereof. The end portion of the fixing portion 20c is passed through the temporary fixing member insertion hole 18e in the LED board 18 and the temporary fixing member mounting hole in the chassis 14, and stopped at the rear surface of the chassis 14.

Next, an assembly procedure of a backlight device 312 will be explained with reference to FIGS. 13 to 15. First, the chassis 14 is placed on a workbench, and as illustrated in FIG. 15, the LED boards 18 on the right side in the X-axis direction are arranged at predetermined positions on the bottom plate 14a of the chassis 14. Next, the colored portions 24 that are not arranged at the surrounding areas of the temporary fixing member insertion holes 18e are recognized, and then the LED boards 18 and the chassis 14 are temporarily held with the temporary fixing members 25. Further, the LED boards 18 on the left side in the X-axis are connected to the right side of the LED boards 18 at connector portions 18a. The LED boards 18 on the left side are temporarily held on the chassis 14 with the temporary fixing members 25 that are not illustrated. The respective supporting pin insertion holes 18c in the LED board 18 correspond to the supporting pin mounting holes 14d in the chassis 14. The respective rivet insertion holes 18d in the LED board 18 correspond to the rivet mounting holes 14e in the chassis 14. The LEDs 17 are mounted on the LED boards 18 and the diffuser lenses 19 are mounted on the LED board so as to cover the respective LEDs 17.

As illustrated in FIG. 14, the chassis reflection sheet 22 is placed to the front-side surface of the LED board 18. The temporary fixing members 25 pass through the temporary fixing members through holes 22e. The diffuser lenses 19 are passed through the lens through holes 22c in the chassis reflection sheet 22. The connector portions 18a are passed through the connector through holes 22d in the chassis reflection sheet 22. The openings 23 provided for identification purpose overlap the colored portions 24 on the LED board 18 so that parts of the colored portions 24 are visible through the openings 23. Further, the supporting pin through holes 22a in the chassis reflection sheet correspond to the respective supporting pin insertion holes 18c in the LED board 18. Thus, parts of the colored portions 24 provided on the LED board 18 are visible along the peripheral edges of the supporting pin through holes 22a in the chassis reflection sheet 22. Further, the rivet through holes 22b correspond to the respective rivet insertion hole 18d in the LED board 18. Thus, parts of the colored portions 24 are visible along the peripheral edges of the rivet through holes 22b in the chassis reflection sheet 22.

Figure 13:
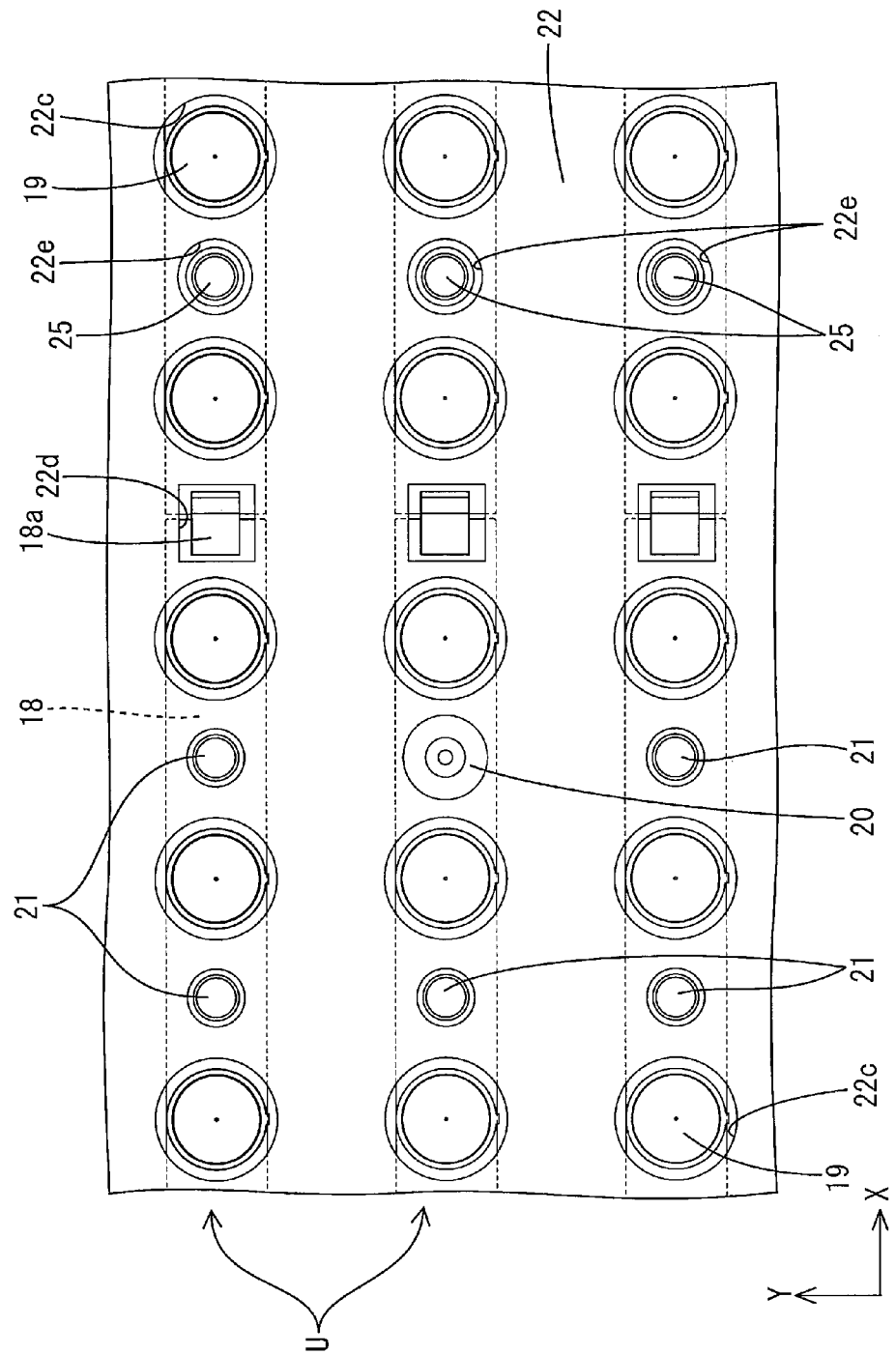
FIG. 13 is a magnified plan view illustrating a supporting pin according to the forth embodiment.

After the chassis reflection sheet 22, the supporting pins 20 and rivets 21 are set as illustrated in FIG. 13. First, the rivet through holes 22b are visually recognized that they have no openings 23 nearby. Then, the rivets 21 are inserted in the rivet through holes 22b. After all rivets 21 are inserted, the supporting pin through holes 22a that have the openings 23 provided for identification purpose nearby are visually recognized and the supporting pins 20 are inserted in the supporting pin through hole 22a. Specifically, each fixing portion 21b of the rivet 21 is inserted in each of the rivet through hole 22b in the chassis reflection sheet 22 and the rivet insertion hole 18d in the LED board 18. Accordingly, the fixing portion 21b of the rivet 21 is stopped at the rivet mounting hole 14e in the chassis 14. Each fixing portion 20c of the supporting pin 20 is inserted in the supporting pin through hole 22a in the chassis reflection sheet 22 and the supporting pin insertion hole 18c in the LED board 18. Accordingly, the fixing portion 20c of the supporting pin 20 is stopped at the supporting pin mounting hole 14d in the chassis 14.

Next, advantages obtained by this embodiment will be explained. Because the temporary fixing members 25 are provided, the LED boards 18 can be temporarily held on the chassis 14. Thus, the LED boards 18 are less likely to be displaced during assembling so that positions of members and openings that are provided on the chassis 14, the chassis reflection sheet 22, and the LED boards 18 can be easily corresponded. As a result, the assembling workability can be improved.

Further, because the colored portions 24 are not arranged at surrounding areas of the temporary fixing member insertion holes 18e, the temporary fixing member through holes 18e can be distinguished from the supporting pin insertion holes 18c and the rivet insertion holes 18d by the colored portions 24. Therefore, improper mounting of the temporary fixing members 25 to the supporting pin through hole 22a or the rivet through hole 22b, which may result in uneven brightness, is less likely to occur.

Fifth Embodiment

A fifth embodiment of this invention will be explained with reference to FIG. 16. The shape of colored portions 424 are changed from the first embodiment. Other configurations are the same as the first embodiment. The same parts as those in the first embodiment will be indicated by the same symbols and will not be explained.

As illustrated in FIG. 16, each colored portion 424 has a shape corresponding to each of the opening 24, the supporting pin through hole 22a, and the rivet through hole 22b in the chassis reflection sheet 22. The chassis reflection sheet 22 will be explained later. The colored portions 424 are formed on the front-surface side of the LED board 18 by screen printing with black ink. Thus, the printing ink consumption for forming the colored portion 424 can be reduced and this lowers costs.

Other Embodiments

This invention is not limited to the embodiments explained in the above description with reference to the drawings. The following embodiments may be included in the technical scope of this invention, for example.

(1) In the above embodiments, the opening is arranged adjacent to or close to the supporting pin through hole. The opening may be formed adjacent to or close to one of the supporting pin through hole and the rivet through hole. If the opening is arranged close to the rivet through hole, the head portion of the rivet has a diameter greater than that of the flange portion of the supporting pin. Further, the opening is of a size to be covered by the head portion of the rivet when the rivet is mounted to the chassis through the rivet through hole and the rivet insertion hole. On the other hand, the size of the opening is such that at least a part of the opening is visible when the supporting pin is mounted to the chassis through the rivet through hole and the rivet insertion hole.

(2) In the above descriptions, the colored portion is black. However, this invention is not limited thereto. The colored portion may be any colors if the color varies from that of the chassis reflection sheet and if the colored portion can be distinguished from the chassis reflection sheet. For example, the colored portion may be blue or red in addition to black. Further, the chassis reflection sheet and the colored portion may have different optical reflectivities such that the chassis reflection sheet and the colored portion are in colored different from each other.

(3) In the above descriptions, the colored portion is formed by screen printing. However, this invention is not limited thereto. The colored portion may be any colors if the color varies from that of the chassis reflection sheet and if the colored portion can be distinguished from the chassis reflection sheet. For example, the colored portion may be formed on the LED board by laser-printing at the same time of laser-printing serial numbers. Further, a cutout may be formed in a part of the board reflection sheet arranged on the front-surface side of the LED board. Through the cutout, a color of a base board on which the LEDs are mounted is exposed.

(4) In the above descriptions, TFTs are used as switching components of the liquid crystal display device. However, the technology described above can be applied to liquid crystal display devices including switching components other than TFTs (e.g., thin film diode (TFD)). Further, the technology can be applied to not only color liquid crystal display devices but also black-and-white liquid crystal display devices.

(5) In the above descriptions, the liquid crystal display device includes the liquid crystal panel as a display panel. The technology can be applied to display devices including other types of display panel.

(6) In the above descriptions, the television device including the tuner is used. However, the technology can be applied to a display device without a tuner.

EXPLANATION OF SYMBOLS

10: Liquid crystal display device (display device), 11: Liquid crystal panel (display panel), 12, 312: Backlight device (lighting device), 14: Chassis, 14a: Bottom plate, 14d: Supporting pin mounting hole, 14e: Rivet mounting hole, 17: LED (light source), 18: LED board (board), 18c: Supporting pin insertion hole (board through hole), 18d: Rivet insertion hole (board through hole), 18e: Temporary fixing member insertion hole, 19: Diffuser lens, 20: Supporting pin, 21: Rivet, 22: Chassis reflection sheet (reflection member), 22a: Supporting pin through hole (first through hole), 22b: Rivet through hole (second through hole), 23, 123, 223: opening, 24, 424: colored portion, 25: Temporary fixing member, TV: Television device.

The invention claimed is:

1. A lighting device comprising:
a light source;
a board including a plurality of surfaces, the light source being mounted on one of the plurality of surfaces, and the board including board through holes, and colored portions on the one of the plurality of surfaces;
a chassis supporting another one of the plurality of surfaces of the board;
a reflection sheet arranged on the one of the plurality of surfaces of the board, the reflection sheet including a first through hole, a second through hole, and an opening, the opening is arranged adjacent to or close to one of the first through hole and the second through hole;
an optical member arranged opposite the reflection sheet and configured to diffuse light from the light source;
a supporting pin mounted to the chassis through the first through hole in the reflection sheet and one of the board through holes in the board, the supporting pin supporting the optical member; and
a rivet mounted to the chassis through the second through hole in the reflection sheet and another one of the board through holes in the board, the rivet fixing the reflection sheet to the chassis, wherein
one of the board through holes is smaller than the first through hole and is located completely within the first through hole when viewed in plan;
another one of the board through holes is smaller than the second through hole and is located completely within the second through hole when viewed in plan;
the colored portions are in a color different from that of the reflection sheet such that the colored portions are distinguished from the reflection sheet, and the colored portions include a first colored portion, a second colored portion, and a third colored portion,
the first colored portion is positioned to extend beyond and edge of the reflection sheet that defines the first through hole into at least an area that overlaps a portion of the first through hole,
the second colored portion is positioned to extend beyond an edge of the reflection sheet that defines the second through hole into at least an area that overlaps a portion of the second through hole, and
the third colored portion is positioned beyond an edge of the reflection sheet that defines the opening in the reflection sheet into at least an area that overlaps a portion of the opening in the reflection sheet.

2. The lighting device according to claim 1, wherein
the supporting pin further includes a flange portion,
the rivet further includes a head portion that has a dimension smaller than that of the flange portion of the supporting pin, and
the opening is arranged adjacent to or close to the first through hole in the reflection sheet such that the opening is covered by the flange portion of the support pin when the supporting pin is mounted to the chassis through the first through hole in the reflection sheet and the board through hole in the board, or at least a part of the opening is visible when the rivet is mounted to the chassis through the first through hole in the reflection sheet and the board through hole in the board.

3. The lighting device according to claim 1, wherein
the supporting pin further includes a flange portion,
the rivet further includes a head portion that has a dimension greater than that of the flange portion of the supporting pin, and
the opening is arranged adjacent to or close to the second through hole in the reflection sheet such that the opening is covered by the head portion of the rivet when the rivet is mounted to the chassis through the second through hole in the reflection sheet and the board through hole in the board, or at least a part of the opening is visible when the supporting pin is mounted to the chassis through the second through hole in the reflection sheet and the board through hole in the board.

4. The lighting device according to claim 1, further comprising a temporary fixing member mounted to the chassis through the board through hole to temporarily fix the board to the chassis, wherein
the board has an area surrounding the board through hole through which the temporary fixing member is inserted, and
the surrounding area has a different color from that of the colored portions such that the surrounding area is distinguished from the colored portions.

5. The lighting device according to claim 1, wherein the colored portions are formed on the board by printing.

6. The lighting device according to claim 5, wherein the colored portions are arranged only in areas that overlap the opening, the first through hole, and the second through hole, respectively.

7. A display device comprising:
the lighting device for a display device according to claim 1; and
a display panel arranged on a front side of the lighting device for a display device and configured to provide display using light from the lighting device.

8. The display device according to claim 7, wherein the display panel is a liquid crystal panel including liquid crystals sealed between a pair of substrates.

9. A television device comprising the display device according to claim 7.

10. The lighting device according to claim 1, wherein the first colored portion, the second colored portion, and the third colored portion are all black.

11. The lighting device according to claim 1, wherein the first colored portion, the second colored portion, and the third colored portion are covered and not visible when the board is viewed in plan.

* * * * *